US012400581B2

(12) United States Patent
Woo et al.

(10) Patent No.: US 12,400,581 B2
(45) **Date of Patent: *Aug. 26, 2025**

(54) DISPLAY DEVICE

(71) Applicant: Samsung Display Co., LTD., Yongin-si (KR)

(72) Inventors: Min Kyu Woo, Yongin-si (KR); Bon Yong Koo, Yongin-si (KR); Hyun Joon Kim, Yongin-si (KR); Seon Young Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,665

(22) Filed: Oct. 6, 2023

(65) Prior Publication Data

US 2024/0203323 A1 Jun. 20, 2024

(30) Foreign Application Priority Data

Dec. 19, 2022 (KR) ........................ 10-2022-0178608

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2310/0248* (2013.01)

(58) Field of Classification Search
None
See application file for complete search history.

(56) References Cited

U.S. PATENT DOCUMENTS

| | | | | |
|---|---|---|---|---|
| 8,305,336 B2 * | 11/2012 | Park | H05B 45/20 345/207 |
| 9,779,657 B2 | 10/2017 | Kim et al. | |
| 10,614,762 B2 | 4/2020 | Kim et al. | |
| 10,867,555 B2 | 12/2020 | Kim et al. | |
| 2020/0111404 A1 * | 4/2020 | Kim | G09G 3/2011 |
| 2022/0190074 A1 | 6/2022 | Zhao et al. | |
| 2023/0095998 A1 | 3/2023 | Hashikaki | |
| 2023/0196981 A1 | 6/2023 | Kwon et al. | |
| 2023/0238372 A1 | 7/2023 | Lee et al. | |

FOREIGN PATENT DOCUMENTS

| | | | | |
|---|---|---|---|---|
| CN | 101253813 B * | 12/2010 | H05B 33/0815 |
| KR | 10-2019-0081909 A | 7/2019 | |
| KR | 10-2019-0081961 A | 7/2019 | |
| KR | 10-2072795 B1 | 2/2020 | |
| KR | 10-2022-0000895 A | 1/2022 | |
| KR | 10-2023-0113472 A | 7/2023 | |

OTHER PUBLICATIONS

US Notice of Allowance dated Mar. 6, 2025, issued in U.S. Appl. No. 18/506,942 (9 pages).

* cited by examiner

*Primary Examiner* — Duane N Taylor, Jr.
(74) *Attorney, Agent, or Firm* — Womble Bond Dickinson (US) LLP

(57) ABSTRACT

A display device includes a pixel, the pixel including: a light emitting element; a first pixel circuit including at least one capacitor and at least one transistor, and to generate a sweep signal that changes linearly over time from a voltage level of a data signal received through a data line; and a second pixel circuit including at least one transistor, and to adjust a duty cycle of a current flowing through the light emitting element based on the sweep signal.

20 Claims, 16 Drawing Sheets

PWMC_1: PDU1, PDU2, PDU3

GLi: ESLi, EMLi, EML2i, SCLi

PWMC_1: PDU1, PDU2, PDU3

DISPLAY DEVICE

CROSS-REFERENCE TO RELATED APPLICATION

This application claims priority to and the benefit of Korean Patent Application No. 10-2022-0178608, filed on Dec. 19, 2022, the entire disclosure of which is incorporated by reference herein.

BACKGROUND

1. Field

Aspects of embodiments of the present disclosure relate to a display device.

2. Discussion

In recent years, interest in information displays has been increasing. Accordingly, research and development on display devices are continuously being conducted.

SUMMARY

One or more embodiments of the present disclosure are directed to a display device capable of being driven in a pulse width modulation (PWM) method.

However, the aspects and features of the present disclosure are not limited to those described above, and the above and other aspects and features will be more clearly understood by those skilled in the art from the following description.

According to one or more embodiments of the present disclosure, a display device includes a pixel, the pixel including: a light emitting element; a first pixel circuit including at least one capacitor and at least one transistor, and configured to generate a sweep signal that changes linearly over time from a voltage level of a data signal received through a data line; and a second pixel circuit including at least one transistor, and configured to adjust a duty cycle of a current flowing through the light emitting element based on the sweep signal.

In an embodiment, the pixel may include a plurality of pixels, and each of the plurality of pixels may include a corresponding first pixel circuit of the first pixel circuit.

In an embodiment, the first pixel circuit may be configured to linearly decrease a voltage level of the sweep signal while the light emitting element emits light.

In an embodiment, the first pixel circuit may be configured to: charge a capacitor of the at least one capacitor using the data signal; discharge the capacitor at a constant rate using the at least one transistor; and output a voltage of one electrode of the capacitor as the sweep signal.

In an embodiment, the first pixel circuit may include: a first transistor; a first capacitor between a first power source line and a first terminal of the first transistor; a second capacitor between a gate electrode of the first transistor and a second terminal of the first transistor; a second transistor including a first terminal connected to the first power source line, a second terminal connected to the gate electrode of the first transistor, and a gate electrode connected to a second control line; a third transistor including a first terminal connected to the second terminal of the first transistor, a second terminal connected to a second power source line, and a gate electrode connected to a first control line; a fourth transistor including a first terminal connected to a third power source line, a second terminal connected to the first terminal of the first transistor, and a gate electrode connected to a third control line; and a fifth transistor including a first terminal connected to the first terminal of the first transistor, a second terminal connected to the data line, and a gate electrode connected to a fourth control line.

In an embodiment, each of the first, second, third, fourth, and fifth transistors may be an N-type transistor.

In an embodiment, the display device may further include a gate driver connected to the first control line, the second control line, the third control line, and the fourth control line, and in a first period, the gate driver may be configured to apply a first control signal of a turn-on level to the first control line, and apply a second control signal of the turn-on level to the second control line.

In an embodiment, in a second period, the gate driver may be configured to apply a first control signal of a turn-off level to the first control line, and apply a third control signal of the turn-on level to the third control line.

In an embodiment, the first pixel circuit may be configured to change a voltage of the second terminal of the first transistor according to a width of the second period, and change a slope of the sweep signal according to the voltage of the second terminal of the first transistor.

In an embodiment, the first pixel circuit may be configured to decrease the slope of the sweep signal as the width of the second period increases.

In an embodiment, in a third period, the gate driver may be configured to apply a control signal of the turn-off level to the second control line and the third control line, and apply a fourth control signal of the turn-on level to the fourth control line.

In an embodiment, in a fourth period, the gate driver may be configured to apply the first control signal of the turn-on level to the first control line, and the voltage level of the sweep signal may decrease over time.

In an embodiment, the second pixel circuit may include: a sixth transistor connected between a first high power source line and a control node, and configured to operate in response to the sweep signal; a seventh transistor connected between a second high power source line and the light emitting element, and configured to operate in response to a voltage of the control node; an eighth transistor connected between the control node and an initialization power source line; and a third capacitor connected between the control node and the initialization power source line.

According to one or more embodiments of the present disclosure, a display device includes a pixel, the pixel including: a light emitting element; a first pixel circuit including at least one capacitor and at least one transistor, and configured to generate a sweep signal that changes linearly over time from a first voltage level; and a second pixel circuit including at least one transistor, and configured to adjust a duty cycle of a current flowing through the light emitting element based on a data signal received through a data line and the sweep signal.

In an embodiment, the first pixel circuit may be configured to discharge the at least one capacitor at a constant rate using the at least one transistor, and output a voltage of one electrode of the at least one capacitor as the sweep signal.

In an embodiment, the first pixel circuit may include: a first transistor; a first capacitor between a first power source line and a first terminal of the first transistor; a second capacitor between a gate electrode of the first transistor and a second terminal of the first transistor; a second transistor including a first terminal connected to the first power source line, a second terminal connected to the gate electrode of the first transistor, and a gate electrode connected to a second control line; a third transistor including a first terminal connected to the second terminal of the first transistor, a second terminal connected to a second power source line, and a gate electrode connected to a first control line; and a fourth transistor including a first terminal connected to a third power source line, a second terminal connected to the first terminal of the first transistor, and a gate electrode connected to a third control line.

In an embodiment, the display device may further include a gate driver connected to the first control line, the second control line, and the third control line, and in a first period, the gate driver may be configured to apply a first control signal of a turn-on level to the first control line, and apply a second control signal of the turn-on level to the second control line.

In an embodiment, in a second period, the gate driver may be configured to apply a first control signal of a turn-off level to the first control line, and apply a third control signal of the turn-on level to the third control line.

In an embodiment, the first pixel circuit may be configured to change a voltage of the second terminal of the first transistor according to a width of the second period, and change a slope of the sweep signal according to the voltage.

In an embodiment, in a third period, the gate driver may be configured to apply the first control signal of the turn-on level to the first control line, and a voltage level of the sweep signal may decrease over time.

The above and other aspects and features of the present disclosure are described in more detail in the detailed description with reference to the accompanying drawings.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
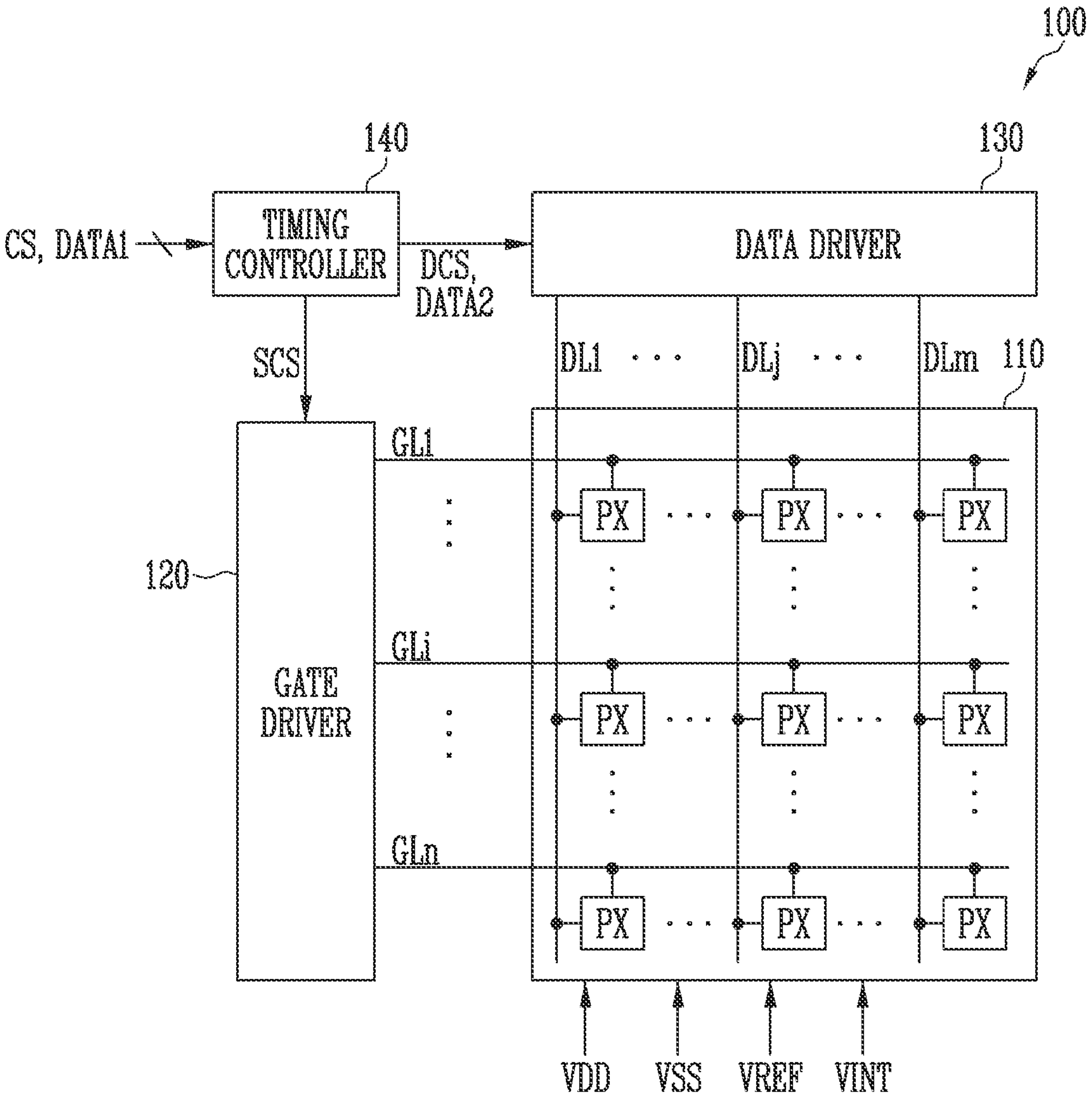
FIG. 1 is a block diagram illustrating a display device according to embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Some embodiments are described with reference to the accompanying drawings in relation to functional blocks, units, and/or modules. Those skilled in the art will understand that such blocks, units, and/or modules are/is physically implemented by a logic circuit, an individual component, a microprocessor, a hard wire circuit, a memory element, a line connection, and/or other electronic circuits. This may be formed using a semiconductor-based manufacturing technique or other manufacturing techniques. The blocks, units, and/or modules implemented by a microprocessor or other similar hardware may be programmed and controlled using software to perform various functions described herein, and optionally may be driven by firmware and/or software. In addition, each block, unit, and/or module may be implemented by dedicated hardware, or a combination of dedicated hardware that performs some functions, and a processor (for example, one or more programmed microprocessors and related circuits) that performs a function different from those of the dedicated hardware. In addition, in some embodiments, the blocks, units, and/or modules may be physically separated into two or more interactive individual blocks, units, and/or modules, without departing from the spirit and scope of the present disclosure. In addition, in some embodiments, the blocks, units, and/or modules may be physically combined into more complex blocks, units, and/or modules without departing from the spirit and scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
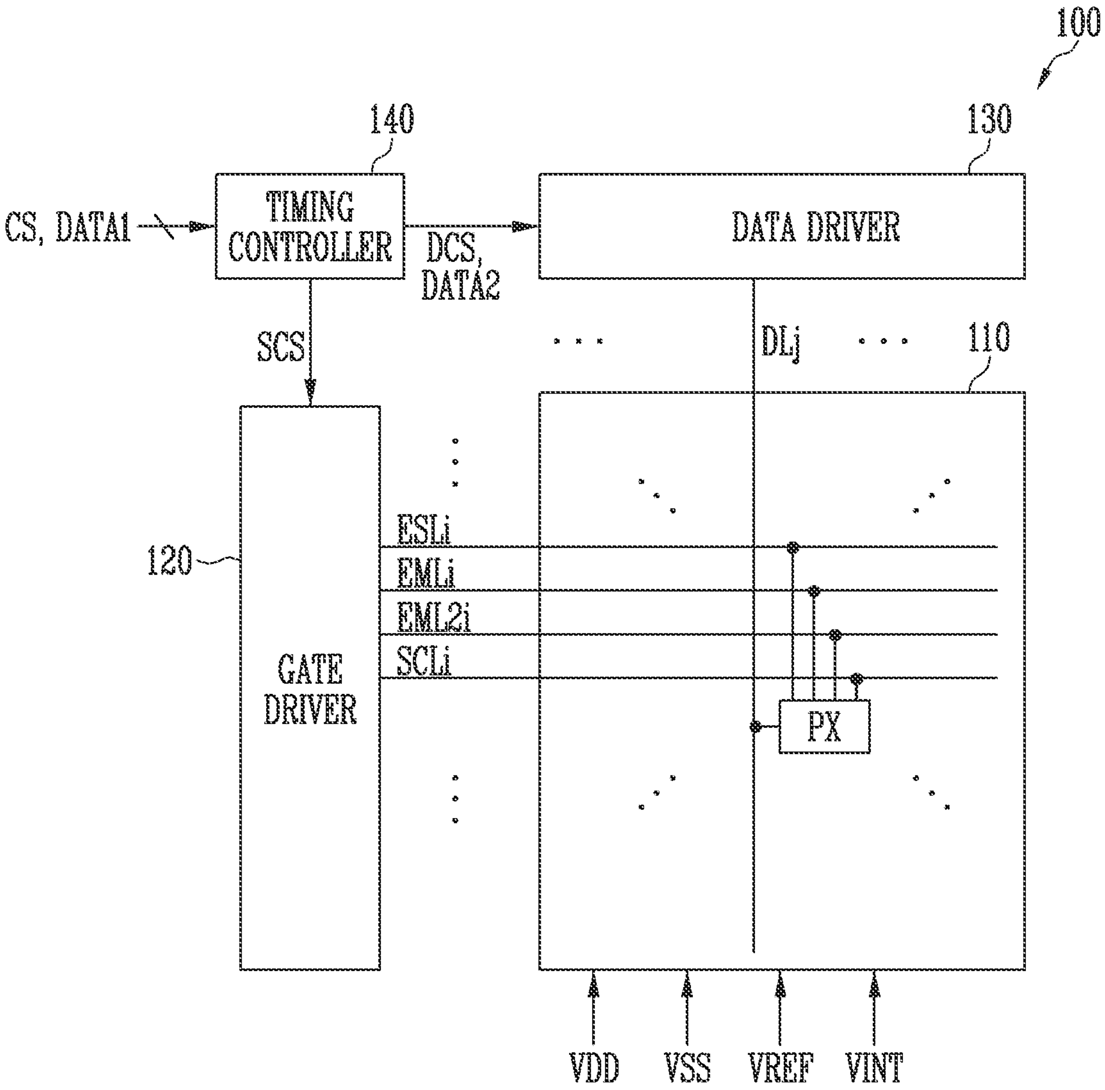
FIG. 2 is a block diagram illustrating an embodiment of the display device of FIG. 1.

FIG. 1 is a block diagram illustrating a display device according to embodiments of the present disclosure. FIG. 2 is a block diagram illustrating an embodiment of the display device of FIG. 1.

Referring to FIGS. 1 and 2, a display device 100 may include a display unit 110 (e.g., a display panel), a gate driver 120 (e.g., a scan driver), a data driver 130 (e.g., a source driver), and a timing controller 140.

The display device 100 may be implemented as a flexible display device, a rollable display device, a curved display device, a transparent display device, a mirror display device, and/or the like. The display device 100 may be implemented as an inorganic light emitting display device. As an example, the display device 100 may be implemented as a display device including an inorganic light emitting element having a nano-scale size or a micro-scale size. However, the present disclosure is not limited thereto, and the display device 100 may include an organic light emitting element.

The display unit 110 may display an image. The display unit 110 may include gate lines GL1 to GLn, data lines DL1 to DLm, and a pixel PX (e.g., a sub-pixel), where n and m may be positive integers. Each of the gate lines GL1 to GLn may include control lines. Referring to FIG. 2, for example, an i-th gate line GLi may include a 1i-th control line ESLi, a 2i-th control line EMLi, a 3i-th control line EML2*i*, and a 4i-th control line SCLi (e.g., an i-th scan line), where i may be a positive integer. A first power source voltage VDD (e.g., a first driving voltage) and a second power source voltage VSS (e.g., a second driving voltage) for driving the pixel PX may be supplied to the display unit 110. Also, an initialization voltage VINT for initializing the pixel PX and a reference voltage VREF may be further supplied to the display unit 110.

The 1i-th control line ESLi, the 2i-th control line EMLi, the 3i-th control line EML2*i*, and the 4i-th control line SCLi may be signal lines to which suitable signals (e.g., specific or predetermined signals) are applied. Here, the term "control line" is used to distinguish it from the other signal lines. The 1i-th control line ESLi, the 2i-th control line EMLi, the 3i-th control line EML2*i*, and the 4i-th control line SCLi are not limited by the term "control line".

The pixel PX may be disposed or positioned in an area (e.g., a pixel area) partitioned by the gate lines GL1 to GLn and the data lines DL1 to DLm.

The pixel PX may be connected to one of the gate lines GL1 to GLn and one of the data lines DL1 to DLm. For example, the pixel PX positioned in an i-th row and a j-th column may be connected to the i-th gate line GLi and a j-th data line DLj. A detailed configuration and operation of the pixel PX will be described below with reference to FIG. 3 and the like.

The gate driver 120 may generate gate signals (e.g., scan signals or control signals) based on a gate control signal SCS (e.g., a scan control signal), and may provide the gate signals to the gate lines GL1 to GLn. Here, the gate control signal SCS may include a start signal, clock signals, and the like, and may be provided from the timing controller 140 to the gate driver 120. For example, the gate driver 120 may be implemented as a shift register that generates and outputs a gate signal by sequentially shifting the start signal having a pulse shape using the clock signals.

The gate driver 120 may be formed together with the pixel PX on the display unit 110. However, the gate driver 120 is not limited thereto. For example, the gate driver 120 may be implemented as an integrated circuit that is mounted on a circuit film, and connected to the timing controller 140 through at least one circuit film and a printed circuit board.

The data driver 130 may generate a data signal (e.g., a data voltage) based on image data DATA2 (e.g., second data) and a data control signal DCS provided from the timing controller 140, and may supply the data signal to the display unit 110 (e.g., the pixels PX) through the data lines DL1 to DLm. Here, the data control signal DCS may be a signal that controls the operation of the data driver 130, and may include a load signal (e.g., a data enable signal) for instructing the output of a valid data signal, a horizontal start signal, a data clock signal, and the like.

For example, the data driver 130 may include a shift register for generating a sampling signal by shifting the horizontal start signal in synchronization with the data clock signal, a latch that latches the image data DATA2 in response to the sampling signal, a digital-to-analog converter (e.g., a decoder) that converts the latched image data (e.g., digital data) into the data signal having an analog form, and a buffer (e.g., an amplifier) that outputs the data signal to the data lines DL1 to DLm.

The timing controller 140 may receive input image data DATA1 and a control signal CS from an external device (e.g., an application processor or a graphics processor), generate the gate control signal SCS and the data control signal DCS based on the control signal CS, and convert the input image data DATA1 to generate the image data DATA2. The control signal CS may include a vertical synchronizing signal, a horizontal synchronizing signal, a reference clock signal, and the like. For example, the timing controller 140 may convert the input image data DATA1 into the image data DATA2 having a format corresponding to a pixel arrangement in the display unit 110.

The data driver 130 and the timing controller 140 may be implemented as separate integrated circuits, but the present disclosure is not limited thereto. For example, the data driver 130 and the timing controller 140 may be implemented as a single integrated circuit. According to an embodiment, at least two of the gate driver 120, the data driver 130, or the timing controller 140 may be implemented as a single integrated circuit.

Figure 3:
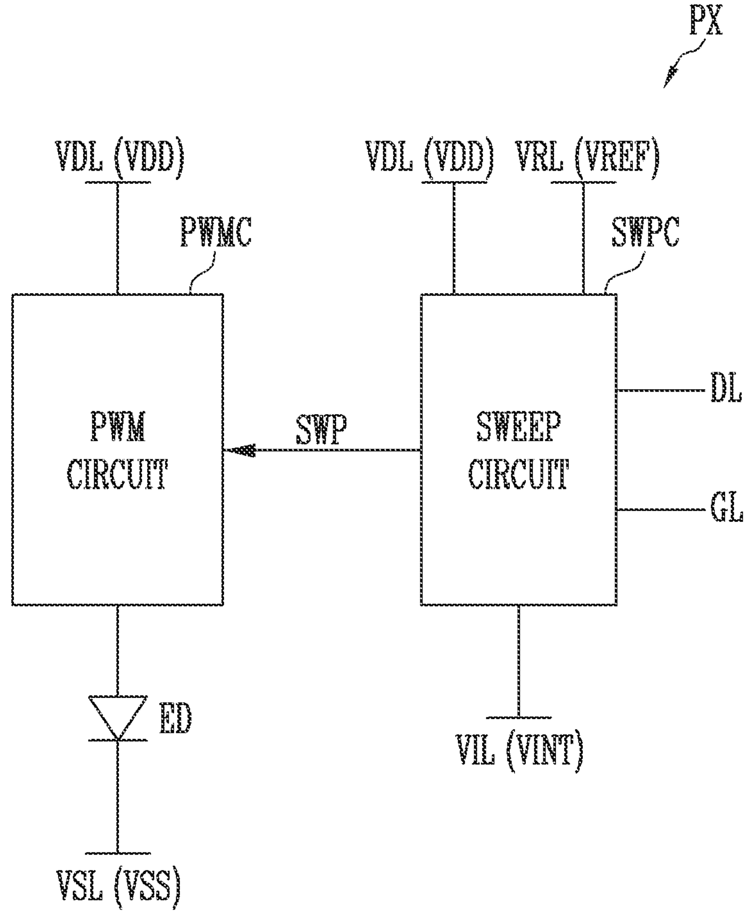
FIG. 3 is a circuit diagram illustrating an embodiment of a pixel included in the display device of FIG. 1.
Figure 4:
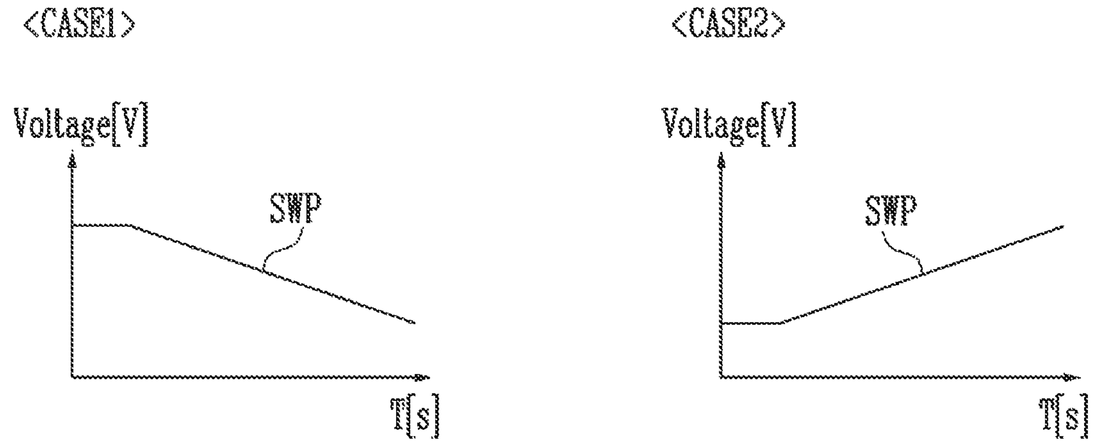
FIG. 4 is a diagram illustrating a sweep signal generated in the pixel of FIG. 3.

FIG. 3 is a circuit diagram illustrating an embodiment of a pixel included in the display device of FIG. 1. FIG. 4 is a diagram illustrating a sweep signal generated in the pixel of FIG. 3.

Referring to FIGS. 1, 3, and 4, the pixel PX may include a light emitting element ED, a sweep circuit SWPC (e.g., a first pixel circuit or a sweep wave generating circuit), and a PWM circuit PWMC (e.g., a second pixel circuit). The sweep circuit SWPC and the PWM circuit PWMC may be provided for each pixel PX.

A first electrode of the light emitting element ED may be connected to a first power source line VDL through the PWM circuit PWMC, and a second electrode of the light emitting element ED may be connected to a second power source line VSL. The first power source voltage VDD may be applied to the first power source line VDL, and the second power source voltage VSS may be applied to the second power source line VSL. A voltage level of the first power source voltage VDD may be higher than that of the second power source voltage VSS. The first electrode of the light emitting element ED may be an anode electrode, and the second electrode of the light emitting element ED may be a cathode electrode. The light emitting element ED may be an inorganic light emitting element including the first electrode, the second electrode, and an inorganic semiconductor disposed between the first electrode and the second electrode. For example, the light emitting element ED may be a micro light emitting diode (e.g., a Micro LED) including (e.g., made of) an inorganic semiconductor, but the present disclosure is not limited thereto.

The sweep circuit SWPC may be connected to the first power source line VDL, a reference voltage line VRL (e.g., a reference power source line), an initialization voltage line VIL (e.g., an initialization power source line), a data line DL (e.g., a first data line), and a gate line GL. A reference voltage VREF may be applied to the reference voltage line VRL. A voltage level of the reference voltage VREF may be higher than that of the first power source voltage VDD, but the present disclosure is not limited thereto. The initialization voltage VINT may be applied to the initialization voltage line VIL, and a voltage level of the initialization voltage VINT may be the same or substantially the same as (or similar to) that of the second power source voltage VSS, but the present disclosure is not limited thereto. The data line DL may be a line corresponding to the pixel PX from among the data lines DL1 to DLm of FIG. 1, and the data signal may be applied to the data line DL. The gate line GL may be a line corresponding to the pixel PX from among the gate lines GL1 to GLn of FIG. 1, and the gate signal may be applied to the gate line GL.

The sweep circuit SWPC may include at least one capacitor and at least one transistor, and may generate a sweep signal SWP based on the data signal and the gate signal.

The sweep signal SWP may have a sweep waveform that changes linearly over time from a voltage level of the data signal. For example, as shown in the first case CASE1 illustrated in FIG. 4, a voltage level of the sweep signal SWP may decrease linearly over time. As another example, as shown in the second case CASE2 illustrated in FIG. 4, the voltage level of the sweep signal SWP may increase linearly over time. The configuration and operation of the sweep circuit SWPC will be described in more detail below with reference to FIGS. 5 and 6.

The PWM circuit PWMC may be connected between the first power source line VDL and the light emitting element ED. According to an embodiment, the PWM circuit PWMC may be further connected to the gate line GL. The PWM circuit PWMC may include at least one capacitor and at least one transistor, and may adjust a duty cycle (e.g., a pulse width, a time when current is supplied to the light emitting element ED, or an emission time) of the current flowing through the light emitting element ED based on the sweep signal SWP. In other words, the PWM circuit PWMC may perform pulse width modulation (PWM).

For example, the PWM circuit PWMC may compare the sweep signal SWP and the first power source voltage VDD (e.g., a voltage corresponding thereto) with each other, and may adjust the duty cycle based on a comparison result. For example, when the voltage level of the sweep signal SWP is greater than the voltage level of the first power source voltage VDD (e.g., a voltage corresponding thereto), current may be supplied to the light emitting element ED. When the voltage level of the sweep signal SWP is lower than the voltage level of the first power source voltage VDD (e.g., a voltage corresponding thereto), the supplied current may be cut off. The PWM circuit PWMC will be described in more detail below with reference to FIGS. 9 to 11.

Figure 5:
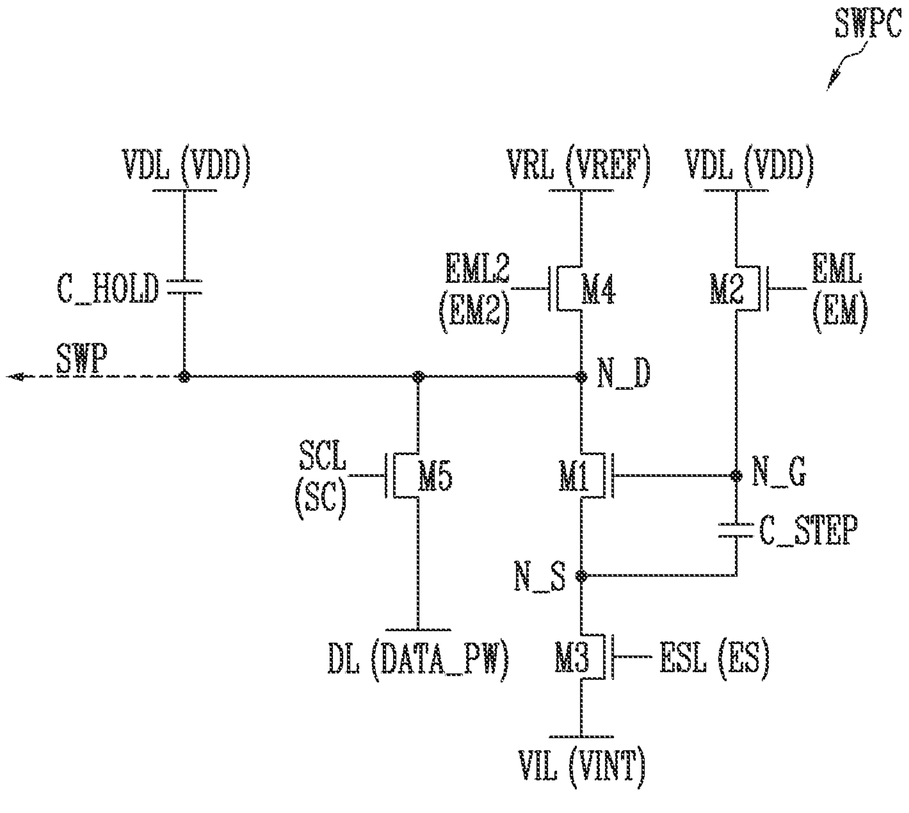
FIG. 5 is a diagram illustrating an embodiment of a sweep circuit included in the pixel of FIG. 3.
Figure 6:
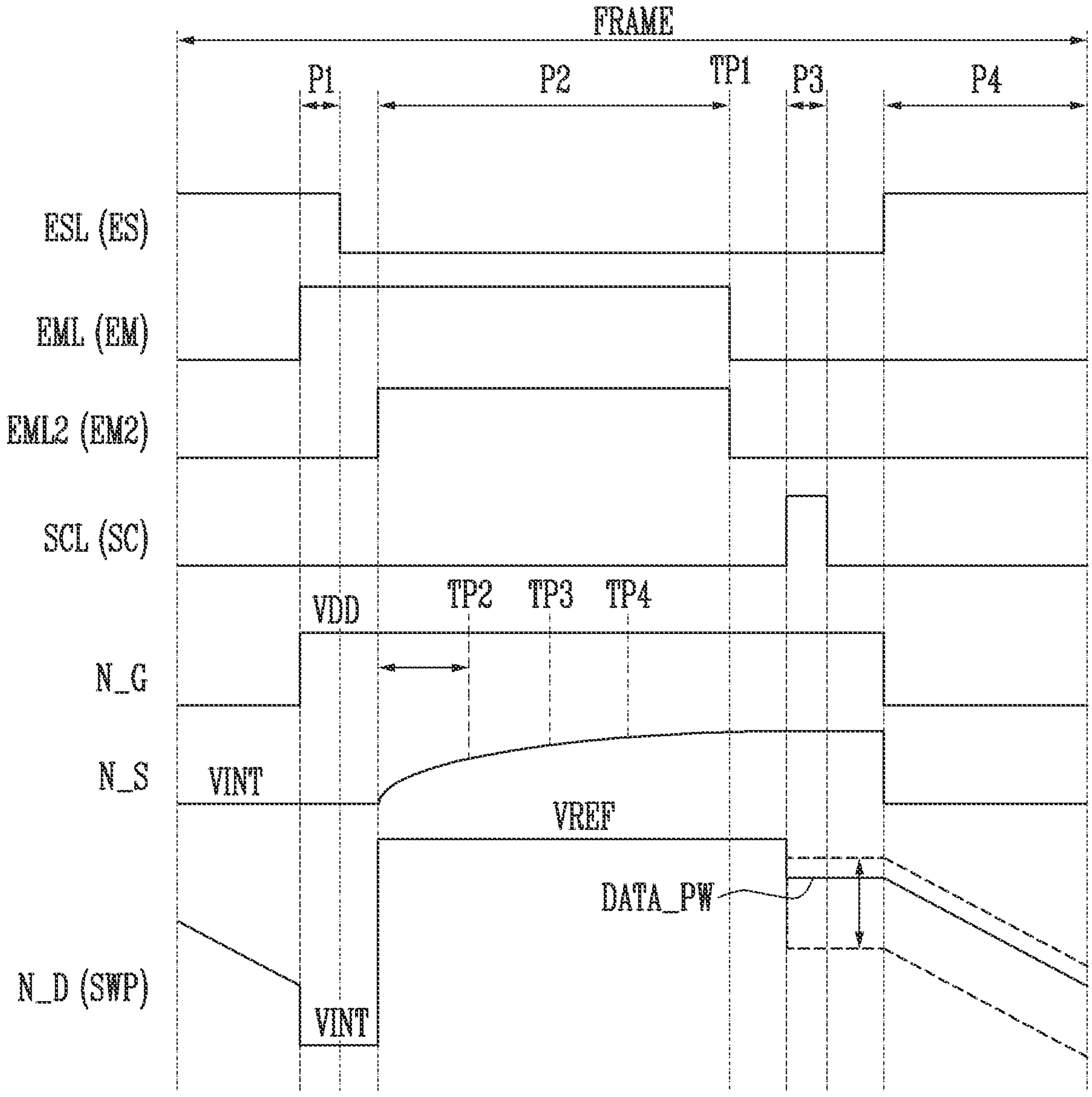
FIG. 6 is a waveform diagram illustrating an operation of the sweep circuit of FIG. 5.

FIG. 5 is a diagram illustrating an embodiment of a sweep circuit included in the pixel of FIG. 3. FIG. 6 is a waveform diagram illustrating an operation of the sweep circuit of FIG. 5.

First, referring to FIGS. 1 to 5, the sweep circuit SWPC may include transistors M1 to M5, a hold capacitor C_HOLD (e.g., a first capacitor), and a step capacitor C_STEP (e.g., a second capacitor). The transistors M1 to M5 may include poly silicon, amorphous silicon, or an oxide semiconductor. Each of the transistors M1 to M5 may be an N-type transistor, but the present disclosure is not limited thereto. For example, at least one of the transistors M1 to M5 may be a P-type transistor.

A first electrode of the first transistor M1 may be connected to a drain node N_D (e.g., a first node), a second electrode of the first transistor M1 may be connected to a source node N_S (e.g., a second node), and a gate electrode of the first transistor M1 may be connected to a gate node N_G. The first electrode (e.g., a first terminal or a first transistor electrode) may be a drain electrode, and the second electrode (e.g., a second terminal or a second transistor electrode) may be a source electrode, but the present disclosure is not limited thereto.

The hold capacitor C_HOLD may be formed and/or connected between the first power source line VDL and the drain node N_D.

The step capacitor C_STEP may be formed and/or connected between the gate node N_G and the source node N_S.

A first electrode of the second transistor M2 may be connected to the first power source line VDL, a second electrode of the second transistor M2 may be connected to the gate node N_G, and a gate electrode of the second transistor M2 may be connected to a second control line EML. A second control signal EM (e.g., a second gate signal) may be applied to the second control line EML.

A first electrode of the third transistor M3 may be connected to the source node N_S, a second electrode of the third transistor M3 may be connected to the initialization voltage line VIL, and a gate electrode of the third transistor M3 may be connected to a first control line ESL. A first control signal ES (e.g., a first gate signal) may be applied to the first control line ESL.

A first electrode of the fourth transistor M4 may be connected to the reference voltage line VRL, a second electrode of the fourth transistor M4 may be connected to the drain node N_D, and a gate electrode of the fourth transistor M4 may be connected to a third control line EML2. A third control signal EM2 (e.g., a third gate signal) may be applied to the third control line EML2.

A first electrode of the fifth transistor M5 may be connected to the drain node N_D, a second electrode of the fifth transistor M5 may be connected to the data line DL, and a gate electrode of the fifth transistor M5 may be connected a fourth control line SCL. A fourth control signal SC (e.g., a fourth gate signal) may be applied to the fourth control line SCL.

The first control line ESL, the second control line EML, the third control line EML2, and the fourth control line SCL may be included in the gate line GL of FIG. 3.

The sweep circuit SWPC may charge the hold capacitor C_HOLD using a data signal DATA_PW of the data line DL, discharge the hold capacitor C_HOLD at a constant or substantially constant rate using the transistors M1 to M5, and output a voltage of one electrode of the hold capacitor C_HOLD (e.g., a voltage of the drain node N_D) as the sweep signal SWP.

Referring to FIGS. 5 and 6, one frame period FRAME may include a first period P1, a second period P2, a third period P3, and a fourth period P4.

In the first period P1, the first control signal ES of the first control line ESL may have a turn-on level, the second control signal EM of the second control line EML may have the turn-on level, the third control signal EM2 of the third control line EML2 may have a turn-off level, and the fourth control signal SC of the fourth control line SCL may have the turn-off level. Based on the N-type transistor, the turn-on level (e.g., a gate-on level) may be a high level, and the turn-off level (e.g., a gate-off level) may be a low level.

In this case, the second transistor M2 and the third transistor M3 may be turned on, and the fourth transistor M4 and the fifth transistor M5 may be turned off. The gate node N_G may be connected to the first power source line VDL through the turned-on second transistor M2, and a voltage level of the gate node N_G may become equal to or substantially equal to the voltage level of the first power source voltage VDD. The expression "voltage level of a node" may refer to a "voltage level of a voltage at the node". The source node N_S may be connected to the initialization voltage line VIL through the turned-on third transistor M3, and a voltage level of the source node N_S may become equal to or substantially equal to the voltage level of the initialization voltage VINT. The first transistor M1 may be turned on in response to a voltage difference (e.g., VDD-VINT) between the gate node N_G and the source node N_S, the drain node N_D may be connected to the source node N_S through the turned-on first transistor M1, and a voltage level of the drain node N_D (and the sweep signal SWP) may become equal to or substantially equal to the voltage level of the initialization voltage VINT. In other words, in the first period P1, the first transistor M1 may be initialized or the first transistor M1 may be set to a turned-on state.

In the second period P2, the first control signal ES may have the turn-off level, and the second control signal EM and the third control signal EM2 may have the turn-on level.

In this case, the third transistor M3 may be turned off, and the fourth transistor M4 may be turned on. The drain node N_D may be connected to the reference voltage line VRL through the turned-on fourth transistor M4, and the voltage level of the drain node N_D (and the sweep signal SWP) may become equal to or substantially equal to the voltage level of the reference voltage VREF. Current may flow from the drain node N_D to the source node N_S through the turned-on first transistor M1, and the step capacitor C_STEP may be charged or discharged by the current. In the second period P2, the voltage level of the source node N_S may increase to a suitable level (e.g., a specific or predetermined level), for example, such as a voltage level corresponding to the first power source voltage VDD, over time.

In an embodiment, depending on the width (e.g., a time width) of the second period P2, the voltage level of the source node N_S may change, and a slope of the sweep signal SWP (or in other words, the slope of the sweep signal SWP in the fourth period P4) may change.

Because the voltage level of the gate node N_G has (e.g., is fixed to) the voltage level of the first power source voltage VDD, when the voltage level of the source node N_S is changed, a gate-source voltage of the first transistor M1 may be changed, and the amount of current flowing through the first transistor M1 may be changed according to the gate-source voltage of the first transistor M1. In other words, in the second period P2, the amount of current flowing through the first transistor M1 may be set.

For example, when an end time point of the second period P2 is a second time point TP2 instead of a first time point TP1, the voltage level of the source node N_S may be set to be relatively low, the gate-source voltage of the first transistor M1 may be relatively increased, and the amount of current flowing through the first transistor M1 may be relatively increased. When the amount of current is relatively large, the hold capacitor C_HOLD may be discharged relatively quickly in the fourth period P4, and the slope of the sweep signal SWP may increase or become steep.

As another example, when the end time point of the second period P2 is a third time point TP3 instead of the second time point TP2, the voltage level of the source node N_S may be set relatively high, the gate-source voltage of the first transistor M1 may be relatively reduced, and the amount of current flowing through the first transistor M1 may be relatively reduced. When the amount of current is relatively small, the hold capacitor C_HOLD may be discharged relatively slowly in the fourth period P4, and the slope of the sweep signal SWP may decrease or become gentle. When the end time point of the second period P2 is a fourth time point TP4 instead of the third time point TP3, the voltage level of the source node N_S may be set relatively high, and the slope of the sweep signal SWP may further decrease or become more gentle. In other words, as the width of the second period P2 increases, the slope of the sweep signal SWP may decrease.

For reference, the slope of the sweep signal SWP desired may be different depending on the product, or the setting for the slope of the sweep signal SWP may be desired depending on the product. In addition, in the same product, the sweep signal SWP having a different slope may be desired depending on a driving condition. For example, when a display device displays an image with a high frequency, the width (e.g., the time width) of a frame FRAME may be reduced, the cycle of the sweep signal SWP may be shortened, and the slope of the sweep signal SWP may be increased.

According to one or more embodiments of the present disclosure, the slope (and/or the cycle) of the sweep signal SWP may be easily adjusted by adjusting the width of the second period P2 (or in other words, by adjusting the time during which the third control signal EM2 has the turn-on level).

In the third period P3, the first control signal ES, the second control signal EM, and the third control signal EM2 may have the turn-off level, and the fourth control signal SC may have the turn-on level.

In this case, the second transistor M2 and the fourth transistor M4 may be turned off, and the fifth transistor M5 may be turned on. The drain node N_D may be connected to the data line DL through the turned-on fifth transistor M5, and the voltage level of the drain node N_D (and the sweep signal SWP) may become equal to or substantially equal to the voltage level of the data signal DATA_PW. The hold capacitor C_HOLD may be charged with the data signal DATA_PW. The voltage level of the drain node N_D (and the sweep signal SWP) may be changed according to the data signal DATA_PW. In other words, in the third period P3, the data signal DATA_PW may be written into the sweep circuit SWPC (e.g., the pixel including the same).

In the fourth period P4, the first control signal ES may have the turn-on level, and the second control signal EM, the third control signal EM2, and the fourth control signal SC may have the turn-off level.

In this case, the third transistor M3 may be turned on. Because the first transistor M1 is turned on, a current path may be formed from the drain node N_D to the initialization voltage line VINT via the first and third transistors M1 and M3, and the hold capacitor C_HOLD may be discharged.

Charges charged in the hold capacitor C_HOLD may be discharged in proportion to the amount of current set in the second period P2 (or in other words, the amount of current flowing through the first transistor M1). Correspondingly, the voltage level of the drain node N_D (and the sweep signal SWP) may decrease. In other words, the sweep signal SWP may have a waveform having a slope corresponding to the amount of current and a voltage level decreasing over time from the data signal DATA_PW.

As described above, the sweep circuit SWPC may generate the sweep signal SWP corresponding to or imitating the data signal DATA_PW. In addition, the slope and cycle of the sweep signal SWP may be easily adjusted by changing the width (e.g., the time width) of the second period P2.

Figure 7:
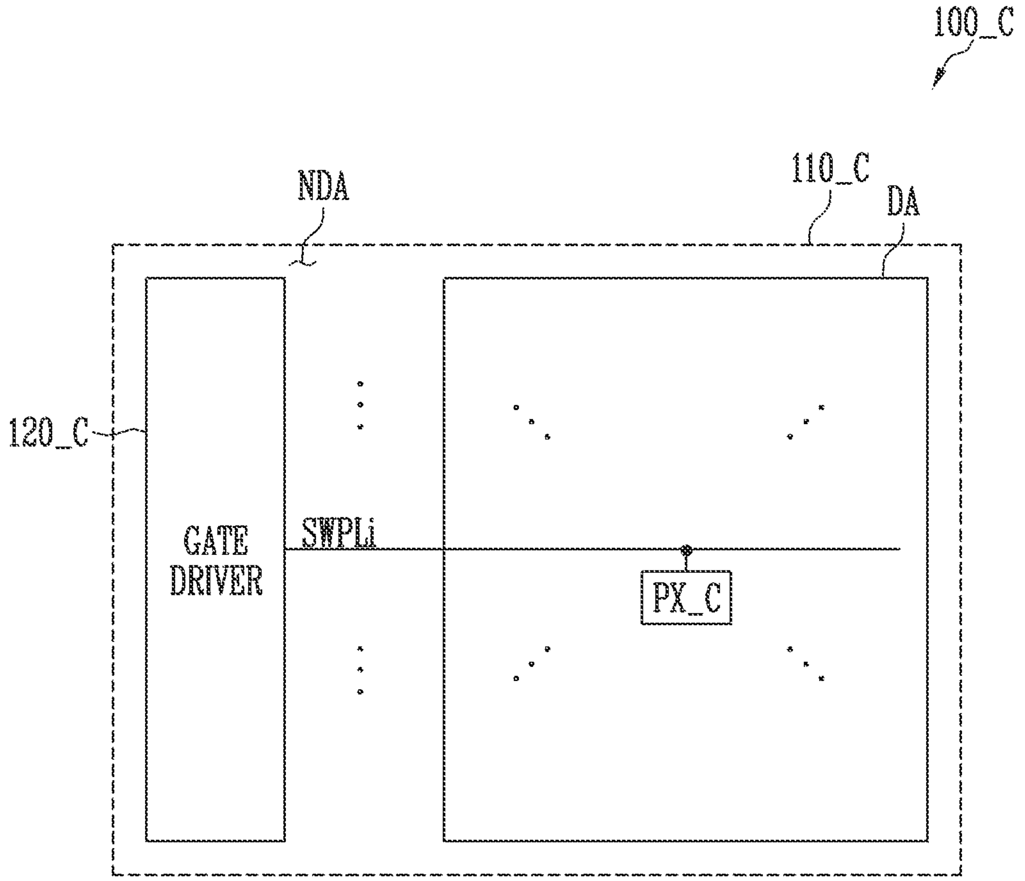
FIG. 7 is a diagram illustrating a display device according to a comparative example.
Figure 8:
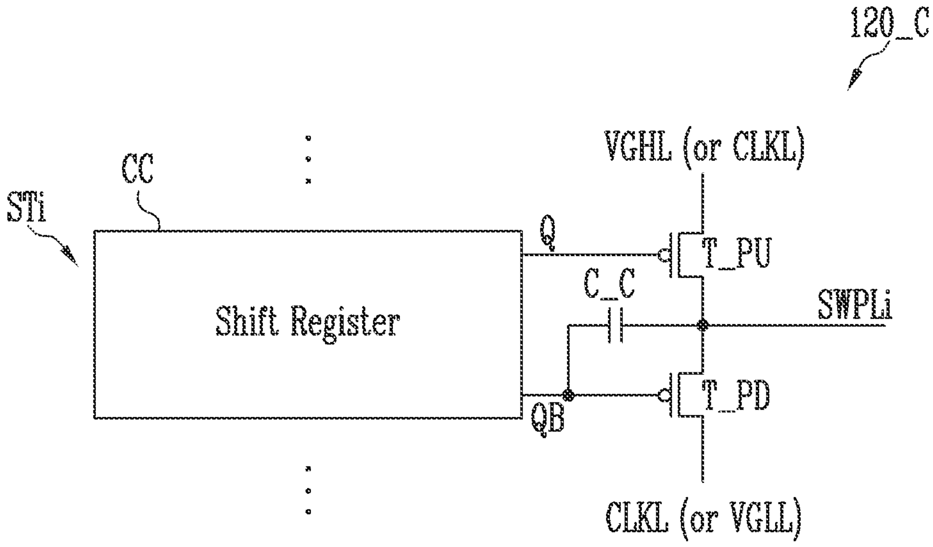
FIG. 8 is a diagram illustrating a gate driver included in the display device according to the comparative example of FIG. 7.

FIG. 7 is a diagram illustrating a display device according to a comparative example. FIG. 8 is a diagram illustrating a gate driver included in the display device according to the comparative example of FIG. 7.

Referring to FIGS. 1, 7, and 8, a display device 100_C of FIG. 7 may include a display unit 110_C and a gate driver 120_C.

The display unit 110_C according to the comparative example may include a pixel PX_C. The pixel PX_C according to the comparative example may include a PWM circuit PWMC and a light emitting element ED like that of FIG. 3, but may not include the sweep circuit SWPC.

The gate driver 120_C according to the comparative example may provide a sweep signal to the pixel PX_C located in an i-th row through an i-th sweep signal line SWPLi. For example, the gate driver 120_C may be implemented as a shift register, and may provide the sweep signal for each row.

The gate driver 120_C may be located in a non-display area NDA of the display unit 110_C, and may be formed concurrently (e.g., simultaneously or substantially simultaneously) with the pixel PX_C of a display area DA.

Referring to FIG. 8, the gate driver 120_C may include an i-th stage STi connected to the i-th sweep signal line SWPLi.

A control circuit CC of the i-th stage STi may control a Q node and a QB node using an output of a previous stage. An output circuit (e.g., a buffer) of the i-th stage STi may output a high voltage or a clock signal (e.g., a sweep clock signal) as the sweep signal or may output a clock signal or a low voltage as the sweep signal based on a voltage of the Q node and a voltage of the QB node. The high voltage may be applied to a high voltage line VGHL, the clock signal may be applied to a clock line CLKL, and the low voltage may be applied to a low voltage line VGLL.

As such, the output circuit of the i-th stage STi may include a pull-up transistor T_PU, a pull-down transistor T_PD, and a capacitor C_C. The connection structure of the pull-up transistor T_PU, the pull-down transistor T_PD, and the capacitor C_C may be the same as that illustrated in FIG. 8.

In the gate driver 120_C including the structure shown in FIG. 8 (or in other words, a circuit based on a shift register), it may be difficult to adjust the cycle of the sweep signal. For example, if the control circuit CC is designed in advance to operate in response to the sweep signal having a specific waveform (e.g., a specific cycle or a specific slope), adjusting the cycle of the sweep signal may not be permitted. For example, in order to change the cycle of the sweep signal using a clock signal, different clock signals may be required for each stage, and n different clock lines CLKL may be required corresponding to pixel rows. In this case, a space for disposing the clock lines CLKL, or in other words, the non-display area NDA (e.g., a dead space) of FIG. 7 may need to be increased. In other words, when the non-display area NDA (e.g., the dead space) is limited, the clock lines CLKL cannot be suitably disposed.

According to one or more embodiments of the present disclosure, because the sweep circuit SWPC is embedded for each pixel PX (e.g., refer to FIG. 3), and the sweep circuit SWPC may have the structure shown in FIG. 5, the cycle (and/or the slope) of the sweep signal may be easily adjusted.

In addition, according to one or more embodiments of the present disclosure, because the sweep signal is directly generated based on the data signal, the circuit structure may be simplified compared to a pixel (e.g., the pixel of FIG. 15) that generates a sweep signal using a separate reference sweep signal and data signal.

Figure 9:
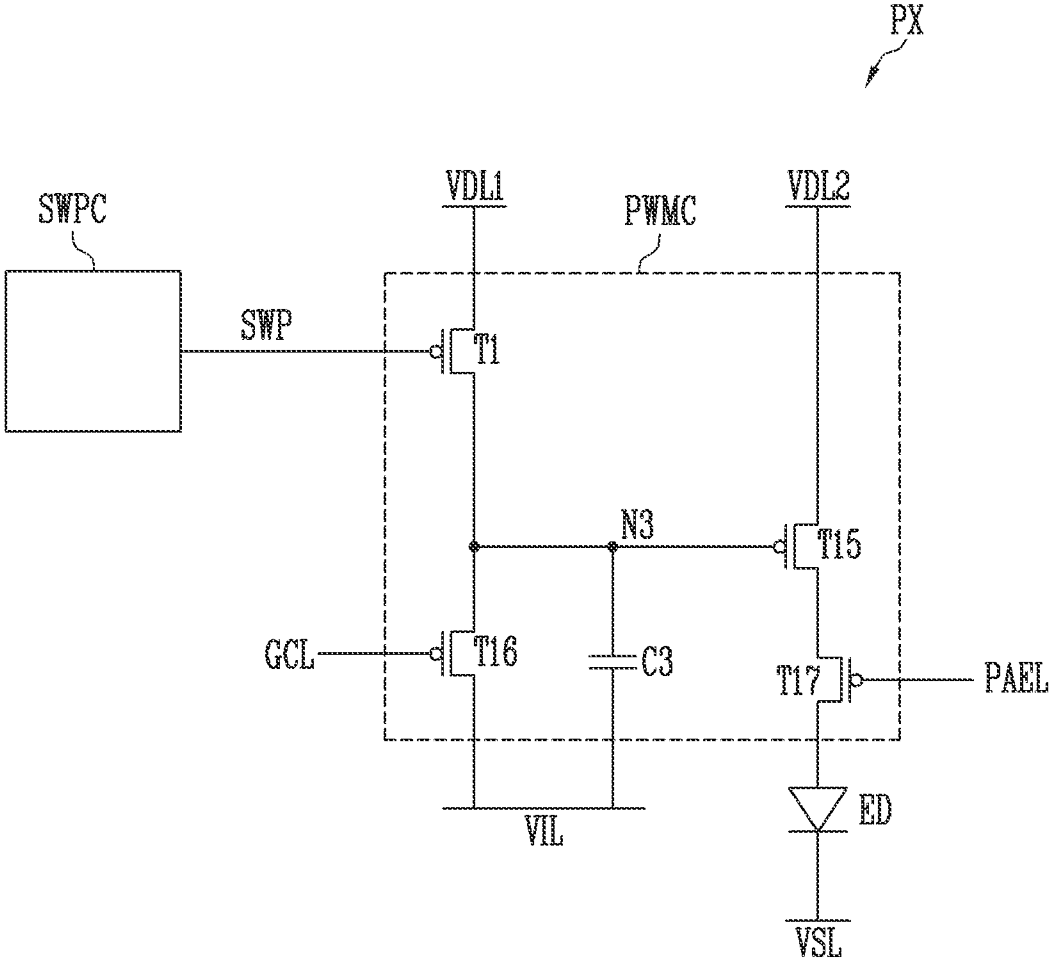
FIG. 9 is a diagram illustrating an embodiment of a PWM circuit included in the pixel of FIG. 3.
Figure 10:
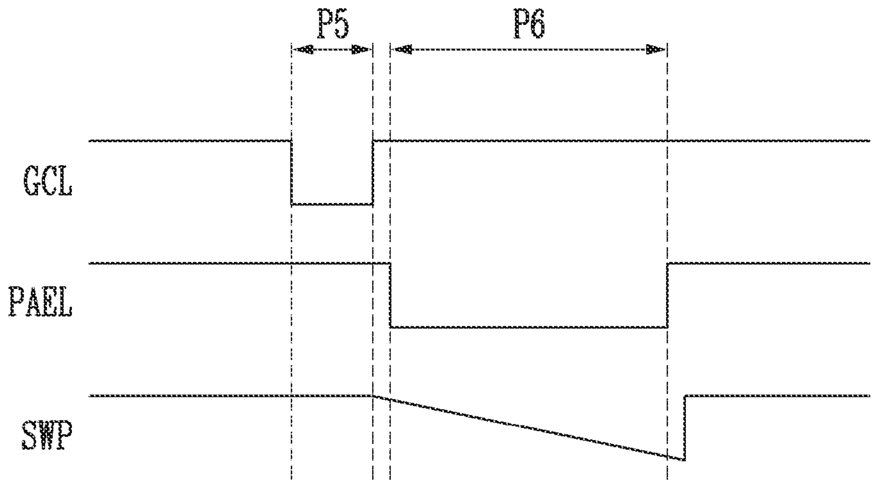
FIGS. 10 and 11 are waveform diagrams illustrating an operation of the PWM circuit of FIG. 9.
Figure 11:
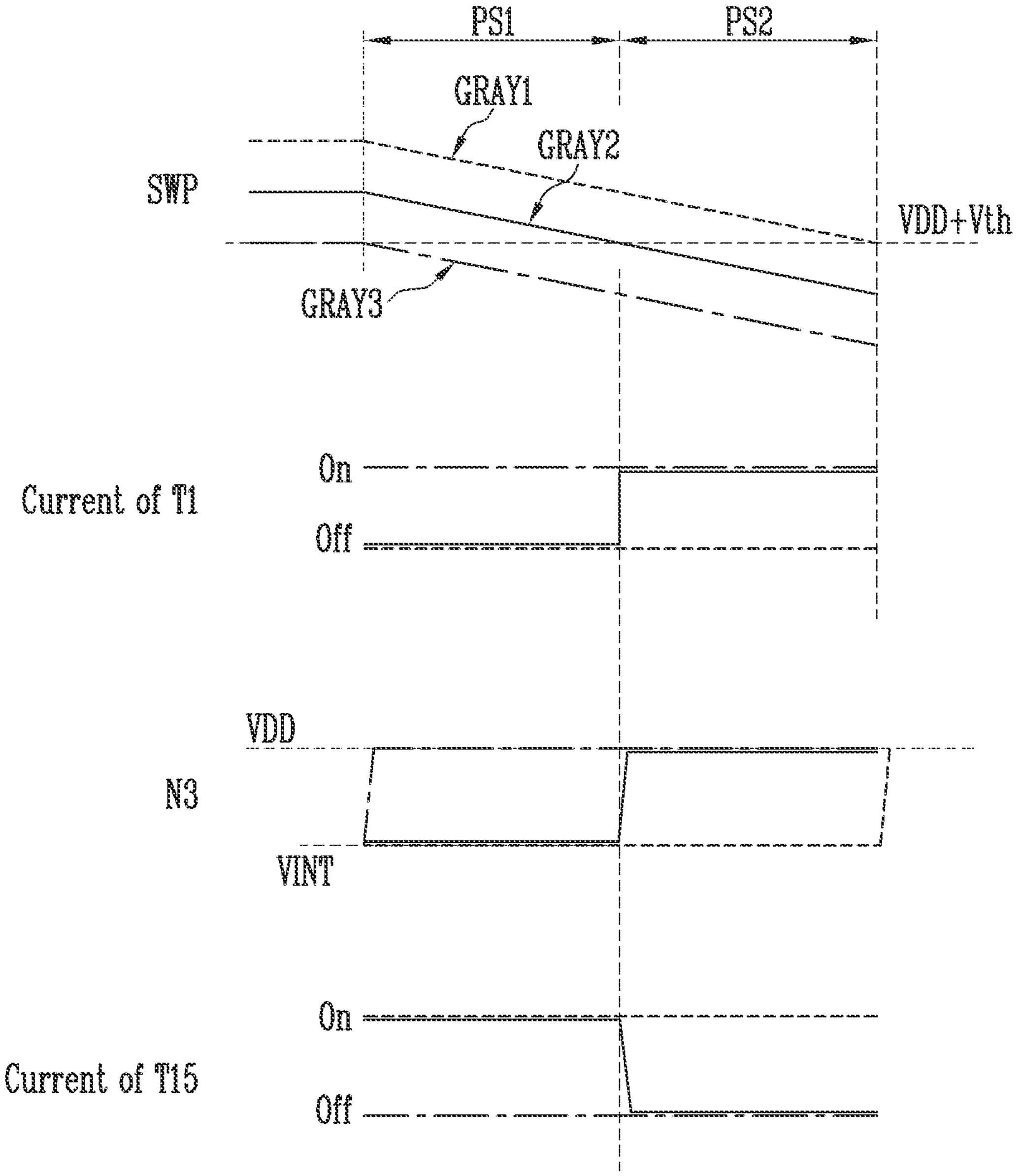

FIG. 9 is a diagram illustrating an embodiment of a PWM circuit included in the pixel of FIG. 3. For convenience of illustration, FIG. 9 further shows the sweep circuit SWPC and the light emitting element ED of the pixel PX. FIGS. 10 and 11 are waveform diagrams illustrating an operation of the PWM circuit of FIG. 9.

First, referring to FIGS. 3 and 9, the PWM circuit PWMC may include a first thin film transistor T1 (e.g., a sixth transistor), a fifteenth thin film transistor T15 (e.g., a seventh transistor), a sixteenth thin film transistor T16 (e.g., an eighth transistor), a seventeenth thin film transistor T17 (e.g., a ninth transistor), and a third capacitor C3. The first, fifteenth, sixteenth, and seventeenth thin film transistors T1, T15, T16, and T17 may be P-type transistors, but the present disclosure is not limited thereto.

A first electrode of the first thin film transistor T1 may be connected to a first high power source line VDL1, a second electrode of the first thin film transistor T1 may be connected to a third node N3 (e.g., a control node), and a gate electrode of the first thin film transistor T1 may be connected to the sweep circuit SWPC. The first high power source line VDL1 may be the same as the first power source line VDL of FIG. 3, or may be included in the first power source line VDL. In other words, the first thin film transistor T1 may be connected between the first high power source line VDL1 and the third node N3, and may be operated in response to the sweep signal SWP of the sweep circuit SWPC.

A first electrode of the fifteenth thin film transistor T15 may be connected to a second high power source line VDL2, a second electrode of the fifteenth thin film transistor T15 may be connected to the light emitting element ED through the seventeenth thin film transistor T17, and a gate electrode of the fifteenth thin film transistor T15 may be connected to the third node N3. The second high power source line VDL2 may be the same as the first power source line VDL of FIG. 3, or may be included in the first power source line VDL. The second high power source line VDL2 may be different from the first high power source line VDL1, but the present disclosure is not limited thereto. In other words, the fifteenth thin film transistor T15 may be connected between the second high power source line VDL2 and the light emitting element ED, and may be operated in response to a voltage of the third node N3.

A first electrode of the sixteenth thin film transistor T16 may be connected to the third node N3, a second electrode of the sixteenth thin film transistor T16 may be connected to the initialization voltage line VIL, and a gate electrode of the sixteenth thin film transistor T16 may be connected to a scan control line GCL. The scan control line GCL (e.g., a fifth control line) may be included in a gate line GL (e.g., the i-th gate line GLi of FIG. 1). In other words, the sixteenth thin film transistor T16 may be connected between the third node N3 and the initialization voltage line VIL, and may be operated in response to a scan control signal of the scan control line GCL.

The third capacitor C3 may be formed and/or connected between the third node N3 and the initialization voltage line VIL.

A first electrode of the seventeenth thin film transistor T17 may be connected to the second electrode of the fifteenth thin film transistor T15, a second electrode of the seventeenth thin film transistor T17 may be connected to the light emitting element ED, and a gate electrode of the seventeenth thin film transistor T17 may be connected to a first emission control line PAEL. In other words, the seventeenth thin film transistor T17 may be connected between the fifteenth thin film transistor T15 and the light emitting element ED, and may be operated in response to a first emission control signal of the first emission control line PAEL.

Referring to FIGS. 9 and 10, a fifth period P5 and a sixth period P6 may be included in one frame period (e.g., the frame period FRAME of FIG. 6).

In the fifth period P5, the scan control signal of a turn-on level may be applied to the scan control line GCL. Based on a P-type transistor, the turn-on level may be a low level, and a turn-off level may be a high level.

In this case, the sixteenth thin film transistor T16 may be turned on, the third node N3 may be connected to the initialization voltage line VIL, and the third capacitor C3 (and the gate electrode of the fifteenth thin film transistor T15) may be reset or initialized by the initialization voltage of the initialization voltage line VIL. The fifteenth thin film transistor T15 may be turned on by the initialization voltage.

The first emission control signal of a turn-off level may be applied to the first emission control line PAEL, the seventeenth thin film transistor T17 may be turned off, and the light emitting element ED may not emit light.

Meanwhile, the sweep signal SWP may be maintained at a suitable voltage level (e.g., a specific or predetermined voltage level). For example, the fifth period P5 may correspond to the first, second, and third periods P1, P2, and P3 of FIG. 6, or may include the first, second, and third periods P1, P2, and P3 of FIG. 6.

In the sixth period P6, the scan control signal of the turn-off level may be applied to the scan control line GCL, and the first emission control signal of the turn-on level may be applied to the first emission control line PAEL. Also, the voltage level of the sweep signal SWP may decrease linearly. The sixth period P6 may correspond to the fourth period P4 of FIG. 6, or may include the fourth period P4 of FIG. 6.

The seventeenth thin film transistor T17 may be turned on, current may flow from the second high power source line VDL2 to the light emitting element ED through the fifteenth thin film transistor T15 and the seventeenth thin film transistor T17, and the light emitting element ED may emit light.

The sixteenth thin film transistor T16 may be turned off. In response to the sweep signal SWP, current may be provided to the third node N3 through the first thin film transistor T1, the third capacitor C3 may be charged by the current, and the voltage level of the third node N3 may increase. When the voltage level of the third node N3 increases to a specific level (e.g., a turn-off level), the fifteenth thin film transistor T15 may be turned off, and the light emitting element ED may not emit light.

Referring to FIGS. 9 to 11, a first sub-period PS1 and a second sub-period PS2 may be included in the sixth period P6 of FIG. 10.

As described with reference to FIG. 6, an initial voltage level of the sweep signal SWP may vary according to the data signal or a grayscale value corresponding thereto. For example, a first grayscale value GRAY1 may be a high grayscale (e.g., a white grayscale), a second grayscale value GRAY2 may be a medium grayscale (e.g., a gray grayscale), and a third grayscale value GRAY3 may be a low grayscale (e.g., a black grayscale). Hereinafter, the second grayscale value GRAY2 or the sweep signal SWP corresponding to the second grayscale value GRAY2 will be described in more detail as a reference.

The first sub-period PS1 may be a period in which the voltage level of the sweep signal SWP is higher than or equal to a reference voltage level. The second sub-period PS2 may be a period in which the voltage level of the sweep signal SWP is lower than the reference voltage level. For example, the reference voltage level may be a maximum voltage level of a voltage at the gate electrode of the first thin film transistor T1 for turning on the first thin film transistor T1, and may be equal to a value obtained by adding a threshold voltage Vth of the first thin film transistor T1 to a voltage of the source electrode of the first thin film transistor T1. For example, based on the turned-on first thin film transistor T1, the reference voltage level may be expressed as "VDD+Vth", and "VDD" may be a power source voltage applied to the first high power source line VDL1 (e.g., the first power source voltage VDD).

Because the voltage level of the sweep signal SWP is higher than the reference voltage level in the first sub-period PS1, the first thin film transistor T1 may be maintained in a turned-off state (e.g., Off), and current may not flow through the first thin film transistor T1. The voltage level of the third node N3 may be maintained to be equal to or substantially equal to the voltage level of the initialization voltage VINT of the initialization voltage line VIL. According to the voltage of the third node N3, the fifteenth thin film transistor T15 may be maintained in a turned-on state (e.g., On), and current may flow through the fifteenth thin film transistor T15. In the first sub-period PS1, the light emitting element ED may emit light based on the current. In other words, the first sub-period PS1 may be an emission period. In the case of the sweep signal SWP corresponding to the first grayscale value GRAY1, the first sub-period PS1 may be longer. In the case of the sweep signal SWP corresponding to the third grayscale value GRAY3, the first sub-period PS1 may be shortened. In other words, the emission time may be adjusted according to a grayscale value.

Because the voltage level of the sweep signal SWP is lower than the reference voltage level in the second sub-period PS2, the first thin film transistor T1 may be turned on (e.g., On), and current may flow through the first thin film transistor T1. The voltage level of the third node N3 may be increased by the current, and the voltage level of the third node N3 may become equal to or substantially equal to the voltage level of the first power source voltage VDD. According to the voltage of the third node N3, the fifteenth thin film transistor T15 may be turned off, and current may not flow through the fifteenth thin film transistor T15. In the second sub-period PS2, the light emitting element ED may not emit light. In other words, the second sub-period PS2 may be a non-emission period.

However, the PWM circuit PWMC is not limited to the one shown in FIG. 9. For example, the PWM circuit PWMC may further include a circuit (e.g., "PDU2" of FIG. 15) for providing a constant current from the second high power source line VDL2 to the fifteenth thin film transistor T15. As another example, the PWM circuit PWMC may include at least a part of the PWM circuit PWMC_1 of FIG. 15. The PWM circuit PWMC may be variously modified within a range of adjusting the pulse width based on the sweep signal SWP.

Figure 12:
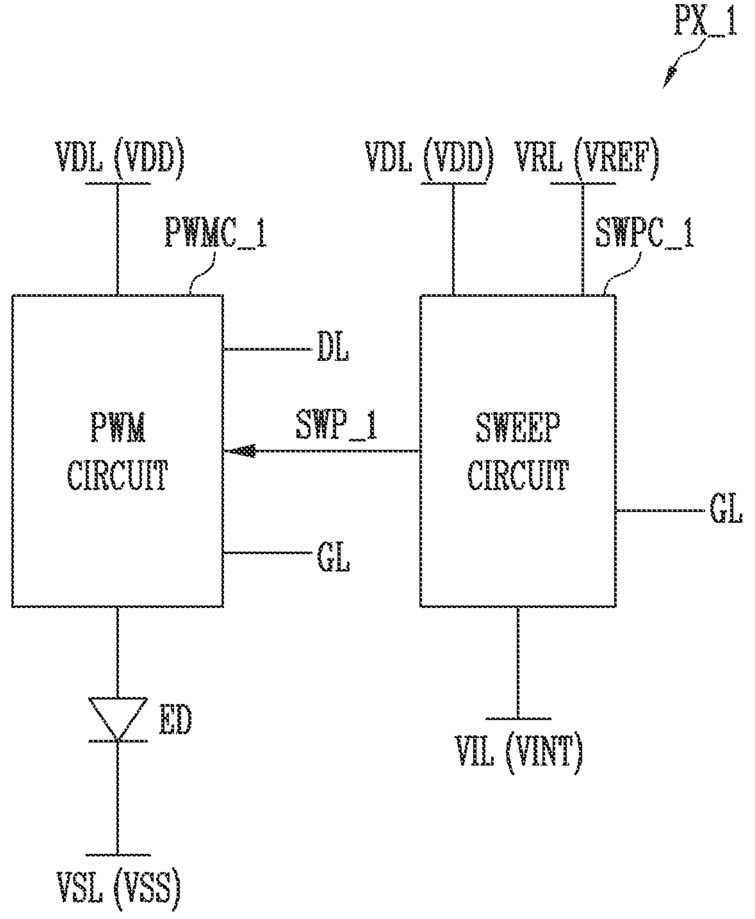
FIG. 12 is a circuit diagram illustrating another embodiment of the pixel included in the display device of FIG. 1.
Figure 13:
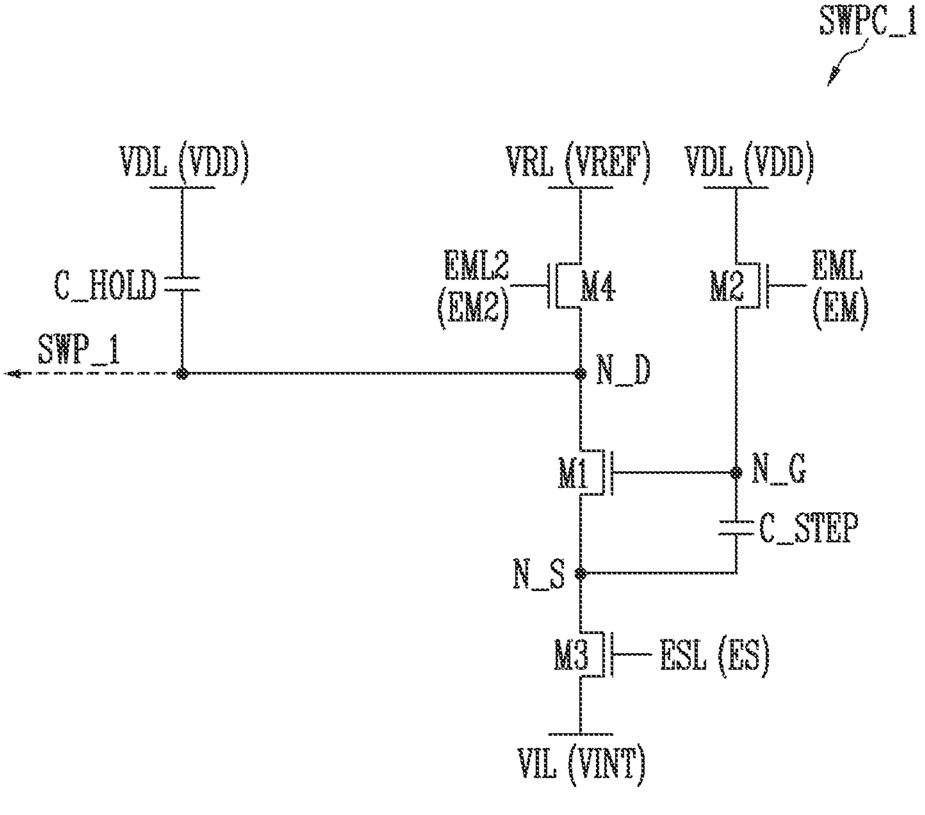
FIG. 13 is a diagram illustrating an embodiment of a sweep circuit included in the pixel of FIG. 12.
Figure 14:
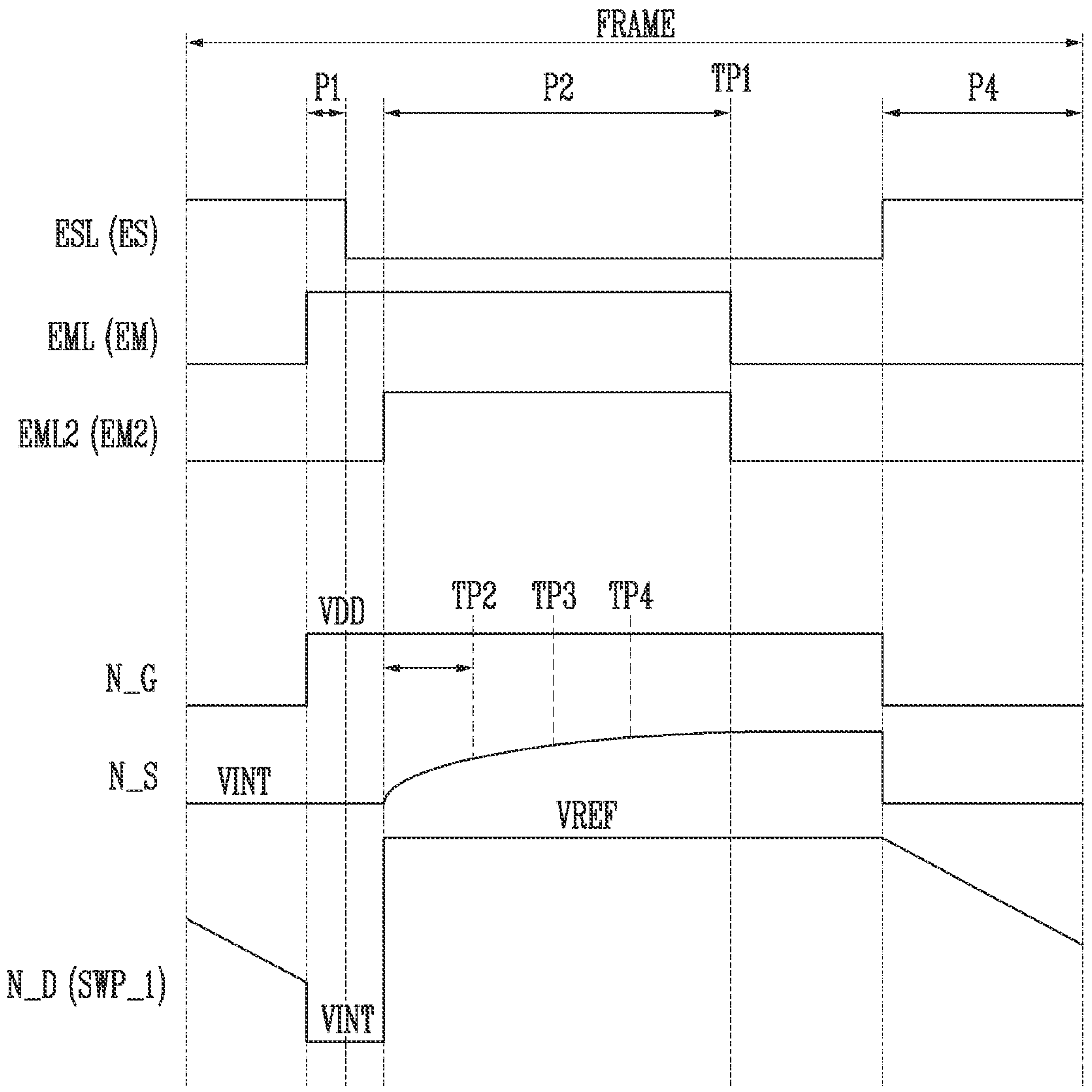
FIG. 14 is a waveform diagram illustrating an operation of the sweep circuit of FIG. 13.

FIG. 12 is a circuit diagram illustrating another embodiment of the pixel included in the display device of FIG. 1. FIG. 13 is a diagram illustrating an embodiment of a sweep circuit included in the pixel of FIG. 12. FIG. 14 is a waveform diagram illustrating an operation of the sweep circuit of FIG. 13.

First, referring to FIGS. 1 to 3 and 12, a pixel PX_1 of FIG. 12 may be the same or substantially the same as (or similar to) the pixel PX of FIG. 3. Therefore, redundant description thereof may not be repeated.

The pixel PX_1 may include a light emitting element ED, a sweep circuit SWPC_1 (e.g., a first pixel circuit), and a PWM circuit PWMC_1 (e.g., a second pixel circuit).

The sweep circuit SWPC_1 may be connected to the first power source line VDL, the reference voltage line VRL, the initialization voltage line VIL, and the gate line GL. The sweep circuit SWPC_1 may include at least one capacitor and at least one transistor, and may generate a sweep signal SWP_1 (e.g., a reference sweep signal) based on the gate signal.

The PWM circuit PWMC_1 may be connected between the first power source line VDL, the data line DL, the gate line GL, and the light emitting element ED. The PWM circuit PWMC_1 may include at least one capacitor and at least one transistor, and may adjust a duty cycle (e.g., a pulse width or an emission time) of the current flowing through the light emitting element ED based on the sweep signal SWP_1 and the data signal of the data line DL.

Referring to FIGS. 5 and 13, except for the fifth transistor M5 of FIG. 5, the sweep circuit SWPC_1 of FIG. 13 may be the same or substantially the same as (or similar to) the sweep circuit SWPC of FIG. 5. Therefore, redundant description thereof may not be repeated.

The sweep circuit SWPC_1 may charge the hold capacitor C_HOLD using the reference voltage VREF, discharge the hold capacitor C_HOLD at a constant or substantially constant rate using the transistors M1 to M4, and output a voltage (e.g., the voltage of the drain node N_D) of one electrode of the hold capacitor C_HOLD as the sweep signal SWP_1.

Referring to FIGS. 5, 6, 13, and 14, except for the operation in the third period P3 of FIG. 6, the operation of the sweep circuit SWPC_1 of FIG. 13 according to the embodiment of FIG. 14 may be the same or substantially the same as (or similar to) the operation of the sweep circuit SWPC_1 of FIG. 5 according to the embodiment of FIG. 6. Therefore, redundant description thereof may not be repeated.

Between the second period P2 and the fourth period P4, because a separate data signal is not written into the sweep circuit SWPC_1, the voltage level of the drain node N_D (e.g., the sweep signal SWP_1) may be maintained to be equal to or substantially equal to the voltage level of the reference voltage VREF.

In the fourth period P4, the first control signal ES may have the turn-on level, and the third transistor M3 may be turned on. Charges stored in the hold capacitor C_HOLD may be discharged, and correspondingly, the voltage level of the drain node N_D (and the sweep signal SWP_1) may decrease from the voltage level of the reference voltage VREF.

As described above with reference to FIG. 6, the slope and the cycle of the sweep signal SWP_1 may be easily adjusted by changing the width (e.g., the time width) of the second period P2.

Figure 15:
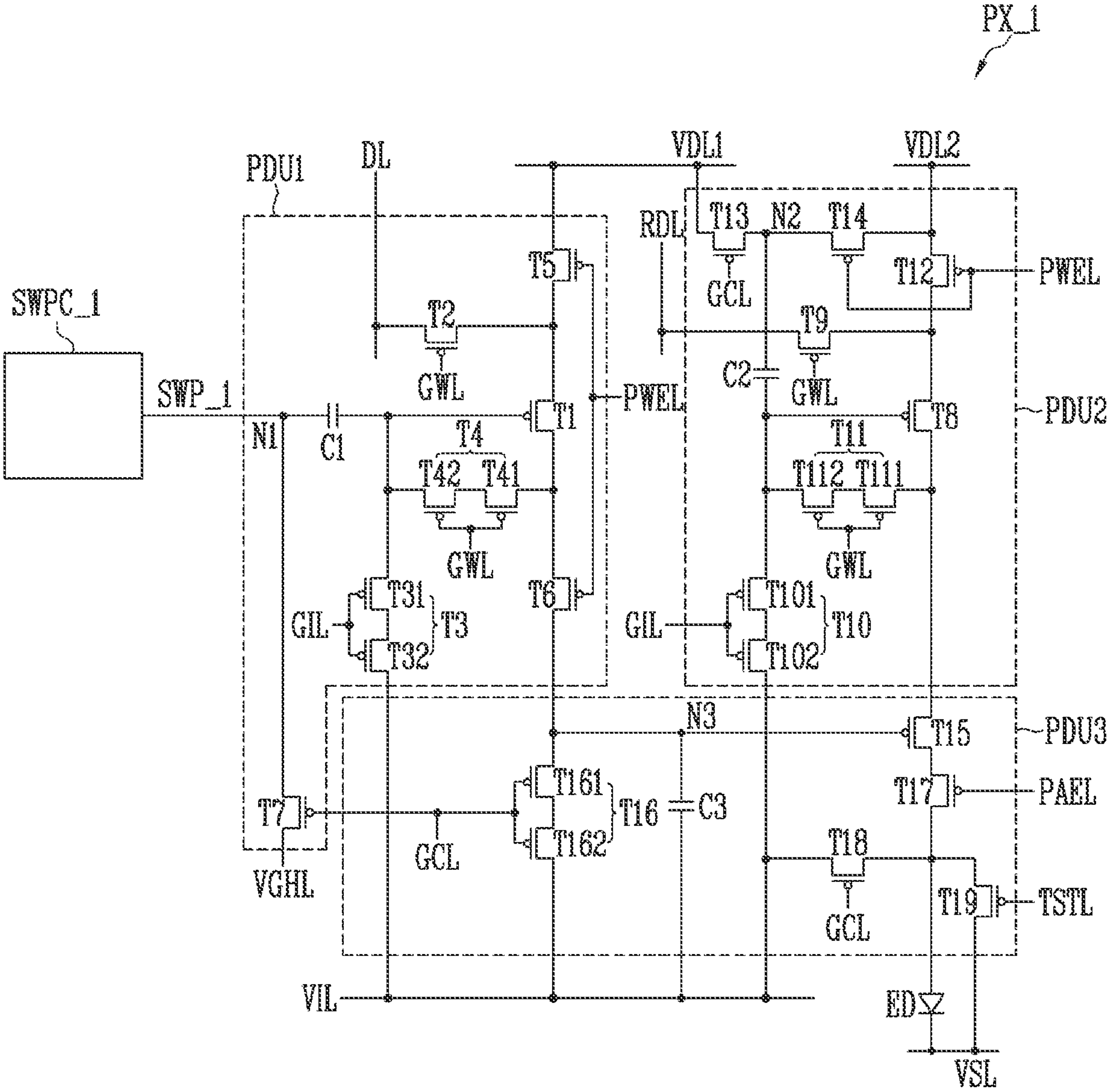
FIG. 15 is a diagram illustrating an embodiment of a PWM circuit included in the pixel of FIG. 12.
Figure 16:
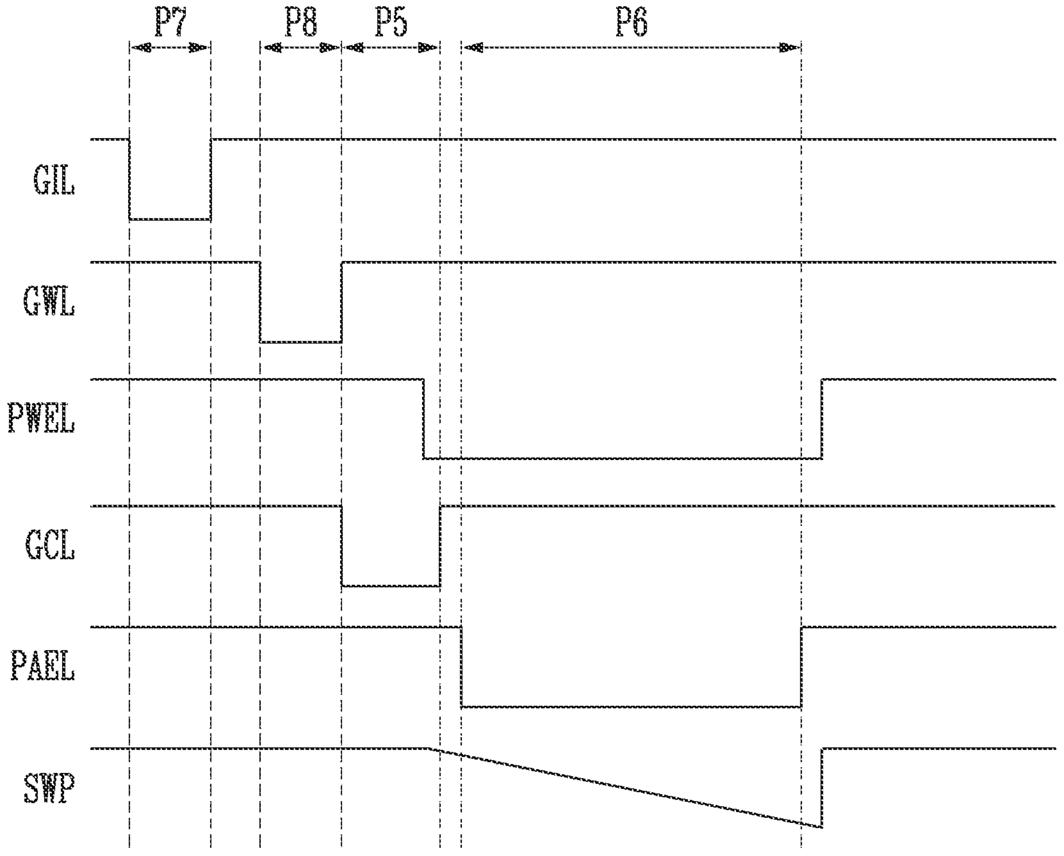
FIG. 16 is a waveform diagram illustrating an operation of the PWM circuit of FIG. 15.

FIG. 15 is a diagram illustrating an embodiment of a PWM circuit included in the pixel of FIG. 12. For convenience of illustration, FIG. 15 further shows the sweep circuit SWPC_1 and the light emitting element ED of the pixel PX_1. FIG. 16 is a waveform diagram illustrating an operation of the PWM circuit of FIG. 15.

Referring to FIGS. 12 to 16, the PWM circuit PWMC_1 may be connected to a scan write line GWL, a scan initialization line GIL, a scan control line GCL, a second emission control line PWEL, a first emission control line PAEL, a data line DL, and a pulse amplitude modulation (PAM) data line RDL (e.g., a second data line). The PAM data line RDL may correspond to the data line DL. The scan write line GWL, the scan initialization line GIL, the scan control line GCL, the second emission control line PWEL, and the first emission control line PAEL may be included in the gate line GL of FIG. 12.

According to an embodiment, the scan write line GWL, the scan initialization line GIL, the scan control line GCL, the second emission control line PWEL, and the first emission control line PAEL of FIG. 15 may be different from the first control line ESL, the second control line EML, the third control line EML2, and the fourth control line SCL of FIG. 6. However, the present disclosure is not limited thereto. At least one of the first control line ESL, the second control line EML, the third control line EML2, or the fourth control line SCL of FIG. 6 may correspond to at least one of the scan write line GWL, the scan initialization line GIL, the scan control line GCL, the second emission control line PWEL, or the first emission control line PAEL. For example, the second control line EML may be the first emission control line PAEL, the third control line EML2 may be the second emission control line PWEL, and/or the fourth control line SCL may be the scan write line GWL. In this case, the total number of gate lines GL1 to GLn in the display unit 110 (e.g., refer to FIG. 1) may be reduced. Also, the size of the gate driver 120 connected to the gate lines GL1 to GLn may be reduced. In other words, the PWM circuit PWMC_1 and the sweep circuit SWPC_1 may not share signal lines (e.g., control lines, gate lines, and the like) with each other, or may share all or some of the signal lines with each other.

The PWM circuit PWMC_1 may include a first pixel driver PDU1 (e.g., a first sub-circuit), a second pixel driver PDU2 (e.g., a second sub-circuit), and a third pixel driver PDU3 (e.g., a third sub-circuit).

The first pixel driver PDU1 may generate a control current based on the data signal of the data line DL, to control a voltage of a third node N3 of the third pixel driver PDU3. The control current of the first pixel driver PDU1 may adjust the pulse width of the voltage applied to the first electrode of the light emitting element ED, and the first pixel driver PDU1 may perform a pulse width modulation of the voltage applied to the first electrode of the light emitting element ED.

The first pixel driver PDU1 may include first to seventh thin film transistors T1 to T7, and a first capacitor C1.

The first thin film transistor T1 may control the control current flowing between the first high power source line VDL1 and the third node N3, based on the data voltage applied to a gate electrode.

The second thin film transistor T2 may be turned on by a scan write signal of the scan write line GWL, to supply the data voltage of the data line DL to the first electrode of the first thin film transistor T1. A gate electrode of the second thin film transistor T2 may be connected to the scan write line GWL, a first electrode of the second thin film transistor T2 may be connected to the data line DL, and a second electrode of the second thin film transistor T2 may be connected to the first electrode of the first thin film transistor T1.

The third thin film transistor T3 may be turned on by a scan initialization signal of the scan initialization line GIL, to electrically connect the initialization voltage line VIL to the gate electrode of the first thin film transistor T1. While the third thin film transistor T3 is turned on, the gate electrode of the first thin film transistor T1 may be discharged with the initialization voltage of the initialization voltage line VIL. A turn-on voltage of the scan initialization signal may be different from the initialization voltage of the initialization voltage line VIL. Because a voltage difference between the turn-on voltage and the initialization voltage is greater than a threshold voltage of the third thin film transistor T3, the third thin film transistor T3 may be stably turned on even after the initialization voltage is applied to the gate electrode of the first thin film transistor T1. Therefore, when the third thin film transistor T3 is turned on, the gate electrode of the first thin film transistor T1 may stably receive the initialization voltage, regardless of the threshold voltage of the third thin film transistor T3.

The third thin film transistor T3 may include a plurality of transistors connected in series. For example, the third thin film transistor T3 may include a first sub-transistor T31 and a second sub-transistor T32. The first and second sub-transistors T31 and T32 may prevent or substantially prevent a voltage of the gate electrode of the first thin film transistor T1 from leaking through the third thin film transistor T3. A gate electrode of the first sub-transistor T31 may be connected to the scan initialization line GIL, a first electrode of the first sub-transistor T31 may be connected to the gate electrode of the first thin film transistor T1, and a second electrode of the first sub-transistor T31 may be connected to a first electrode of the second sub-transistor T32. A gate electrode of the second sub-transistor T32 may be connected to the scan initialization line GIL, the first electrode of the second sub-transistor T32 may be connected to the second electrode of the first sub-transistor T31, and a second electrode of the second sub-transistor T32 may be connected to the initialization voltage line VIL.

The fourth thin film transistor T4 may be turned on by the scan write signal of the scan write line GWL, to electrically connect the gate electrode of the first thin film transistor T1 and the second electrode of the first thin film transistor T1 to each other. Accordingly, the first thin film transistor T1 may operate as a diode (e.g., may be diode-connected) while the fourth thin film transistor T4 is turned on.

The fourth thin film transistor T4 may include a plurality of transistors connected in series. For example, the fourth thin film transistor T4 may include a third sub-transistor T41 and a fourth sub-transistor T42. The third and fourth sub-transistors T41 and T42 may prevent or substantially prevent the voltage of the gate electrode of the first thin film transistor T1 from leaking through the fourth thin film transistor T4. A gate electrode of the third sub-transistor T41 may be connected to the scan write line GWL, a first electrode of the third sub-transistor T41 may be connected to the second electrode of the first thin film transistor T1, and a second electrode of the third sub-transistor T41 may be connected to a first electrode of the fourth sub-transistor T42. A gate electrode of the fourth sub-transistor T42 may be connected to the scan write line GWL, the first electrode of the fourth sub-transistor T42 may be connected to the second electrode of the third sub-transistor T41, and a second electrode of the fourth sub-transistor T42 may be connected to the gate electrode of the first thin film transistor T1.

The fifth thin film transistor T5 may be turned on by a second emission control signal (e.g., a PWM control signal) of the second emission control line PWEL, to electrically connect the first high power source line VDL1 to the first electrode of the first thin film transistor T1. A gate electrode of the fifth thin film transistor T5 may be connected to the second emission control line PWEL, a first electrode of the fifth thin film transistor T5 may be connected to the first high power source line VDL1, and a second electrode of the fifth thin film transistor T5 may be connected to the first electrode of first thin film transistor T1.

The sixth thin film transistor T6 may be turned on by the second emission control signal of the second emission control line PWEL, to electrically connect the second electrode of the first thin film transistor T1 to the third node N3 of the third pixel driver PDU3. A gate electrode of the sixth thin film transistor T6 may be connected to the second emission control line PWEL, a first electrode of the sixth thin film transistor T6 may be connected to the second electrode of the first thin film transistor T1, and a second electrode of the sixth thin film transistor T6 may be connected to the third node N3 of the third pixel driver PDU3.

The seventh thin film transistor T7 may be turned on by the scan control signal of the scan control line GCL, to supply a turn-off voltage of a turn-off voltage line VGHL to a first node N1 connected to the sweep circuit SWPC_1. Therefore, during a period in which the initialization voltage is applied to the gate electrode of the first thin film transistor T1 and a period in which the data voltage of the data line DL and the threshold voltage Vth1 of the first thin film transistor T1 are programmed, the first capacitor C1 may prevent or substantially prevent a change in the voltage at the gate electrode of the first thin film transistor T1 from being reflected to the sweep signal SWP_1 of the sweep circuit SWPC_1. A gate electrode of the seventh thin film transistor T7 may be connected to the scan control line GCL, a first electrode of the seventh thin film transistor T7 may be connected to the turn-off voltage line VGHL, and a second electrode of the seventh thin film transistor T7 may be connected to the first node N1.

The first capacitor C1 may be disposed between the gate electrode of the first thin film transistor T1 and the first node N1. One electrode of the first capacitor C1 may be connected to the gate electrode of the first thin film transistor T1, and the other electrode of the first capacitor C1 may be connected to the first node N1.

The second pixel driver PDU2 may generate a driving current to be supplied to the light emitting element ED based on a PAM data voltage of the PAM data line RDL. The second pixel driver PDU2 may be a pulse amplitude modulation unit (e.g., a PAM unit or a PAM circuit) that performs pulse amplitude modulation. The second pixel driver PDU2 may be a constant current generator for generating the same driving current by receiving the same PAM data voltage, regardless of the luminance of the pixel PX_1 (e.g., the pixels).

The second pixel driver PDU2 may include eighth to fourteenth thin film transistors T8 to T14, and a second capacitor C2.

The eighth thin film transistor T8 may control the driving current flowing to the light emitting element ED based on a voltage applied to a gate electrode.

The ninth thin film transistor T9 may be turned on by the scan write signal of the scan write line GWL, to supply the PAM data voltage of the PAM data line RDL to a first electrode of the eighth thin film transistor T8. A gate electrode of the ninth thin film transistor T9 may be connected to the scan write line GWL, a first electrode of the ninth thin film transistor T9 may be connected to the PAM data line RDL, and a second electrode of the ninth thin film transistor T9 may be connected to the first electrode of the eighth thin film transistor T8.

The tenth thin film transistor T10 may be turned on by the scan initialization signal of the scan initialization line GIL, to electrically connect the initialization voltage line VIL to the gate electrode of the eighth thin film transistor T8. While the tenth thin film transistor T10 is turned on, the gate electrode of the eighth thin film transistor T8 may be discharged with the initialization voltage of the initialization voltage line VIL. A turn-on voltage of the scan initialization signal may be different from the initialization voltage of the initialization voltage line VIL. Because a voltage difference between the turn-on voltage and the initialization voltage is greater than a threshold voltage of the tenth thin film transistor T10, the tenth thin film transistor T10 may be stably turned on even after the initialization voltage is applied to the gate electrode of the eighth thin film transistor T8. Therefore, when the tenth thin film transistor T10 is turned on, the gate electrode of the eighth thin film transistor T8 may stably receive the initialization voltage, regardless of the threshold voltage of the tenth thin film transistor T10.

The tenth thin film transistor T10 may include a plurality of transistors connected in series. For example, the tenth thin film transistor T10 may include a fifth sub-transistor T101 and a sixth sub-transistor T102. The fifth and sixth sub-transistors T101 and T102 may prevent or substantially prevent a voltage of the gate electrode of the eighth thin film transistor T8 from leaking through the tenth thin film transistor T10. A gate electrode of the fifth sub-transistor T101 may be connected to the scan initialization line GIL, a first electrode of the fifth sub-transistor T101 may be connected to the gate electrode of the eighth thin film transistor T8, and a second electrode of the fifth sub-transistor T101 may be connected to a first electrode of the sixth sub-transistor T102. A gate electrode of the sixth sub-transistor T102 may be connected to the scan initialization line GIL, the first electrode of the sixth sub-transistor T102 may be connected to the second electrode of the fifth sub-transistor T101, and a second electrode of the sixth sub-transistor T102 may be connected to the initialization voltage line VIL.

The eleventh thin film transistor T11 may be turned on by the scan write signal of the scan write line GWL, to electrically connect the gate electrode of the eighth thin film transistor T8 and a second electrode of the eighth thin film transistor T8 to each other. Accordingly, the eighth thin film transistor T8 may operate as a diode (e.g., may be diode connected) while the eleventh thin film transistor T11 is turned on.

The eleventh thin film transistor T11 may include a plurality of transistors connected in series. For example, the eleventh thin film transistor T11 may include a seventh sub-transistor T111 and an eighth sub-transistor T112. The seventh and eighth sub-transistors T111 and T112 may prevent or substantially prevent a voltage of the gate electrode of the eighth thin film transistor T8 from leaking through the eleventh thin film transistor T11. A gate electrode of the seventh sub-transistor T111 may be connected to the scan write line GWL, a first electrode of the seventh sub-transistor T111 may be connected to the second electrode of the eighth thin film transistor T8, and a second electrode of the seventh sub-transistor T111 may be connected to the first electrode of the eighth sub-transistor T112. A gate electrode of the eighth sub-transistor T112 may be connected to the scan write line GWL, the first electrode of the eighth sub-transistor T112 may be connected to the second electrode of the seventh sub-transistor T111, and a second electrode of the eighth sub-transistor T112 may be connected to the gate electrode of the eighth thin film transistor T8.

The twelfth thin film transistor T12 may be turned on by the second emission control signal of the second emission control line PWEL, to electrically connect the first electrode of the eighth thin film transistor T8 to the second high power source line VDL2. A gate electrode of the twelfth thin film transistor T12 may be connected to the second emission control line PWEL, a first electrode of the twelfth thin film transistor T12 may be connected to the second high power source line VDL2, and a second electrode of the twelfth thin film transistor T12 may be connected to the first electrode of the eighth thin film transistor T8.

The thirteenth thin film transistor T13 may be turned on by the scan control signal of the scan control line GCL, to electrically connect the first high power source line VDL1 to a second node N2. A gate electrode of the thirteenth thin film transistor T13 may be connected to the scan control line GCL, a first electrode of the thirteenth thin film transistor T13 may be connected to the first high power source line VDL1, and a second electrode of the thirteenth thin film transistor T13 may be connected to the second node N2.

The fourteenth thin film transistor T14 may be turned on by the second emission control signal of the second emission control line PWEL, to electrically connect the first electrode of the eighth thin film transistor T8 to the second node N2. A gate electrode of the fourteenth thin film transistor T14 may be connected to the second emission control line PWEL, a first electrode of the fourteenth thin film transistor T14 may be connected to the second high power source line VDL2, and a second electrode of the fourteenth thin film transistor T14 may be connected to the second node N2.

The second capacitor C2 may be disposed between the gate electrode of the eighth thin film transistor T8 and the second node N2. One electrode of the second capacitor C2 may be connected to the gate electrode of the eighth thin film transistor T8, and the other electrode of the second capacitor C2 may be connected to the second node N2.

The third pixel driver PDU3 may control a period during which the driving current is supplied to the light emitting element ED based on the voltage of the third node N3.

The third pixel driver PDU3 may include fifteenth to nineteenth thin film transistors T15 to T19, and a third capacitor C3.

The fifteenth thin film transistor T15 may be turned on based on the voltage of the third node N3. When the fifteenth thin film transistor T15 is turned on, the driving current of the eighth thin film transistor T8 may be supplied to the light emitting element ED. When the fifteenth thin film transistor T15 is turned off, the driving current of the eighth thin film transistor T8 may not be supplied to the light emitting element ED. Accordingly, a turn-on period of the fifteenth thin film transistor T15 may be the same or substantially the same as an emission period of the light emitting element ED. A gate electrode of the fifteenth thin film transistor T15 may be connected to the third node N3, a first electrode of the fifteenth thin film transistor T15 may be connected to the second electrode of the eighth thin film transistor T8, and a second electrode of the fifteenth thin film transistor T15 may be connected to the first electrode of the seventeenth thin film transistor T17.

The sixteenth thin film transistor T16 may be turned on by the scan control signal of the scan control line GCL, to electrically connect the initialization voltage line VIL to the third node N3. Accordingly, while the sixteenth thin film transistor T16 is turned on, the third node N3 may be discharged with the initialization voltage of the initialization voltage line VIL.

The sixteenth thin film transistor T16 may include a plurality of transistors connected in series. For example, the sixteenth thin film transistor T16 may include a ninth sub-transistor T161 and a tenth sub-transistor T162. The ninth and tenth sub-transistors T161 and T162 may prevent or substantially prevent the voltage of the third node N3 from leaking through the sixteenth thin film transistor T16. A gate electrode of the ninth sub-transistor T161 may be connected to the scan control line GCL, a first electrode of the ninth sub-transistor T161 may be connected to the third node N3, and a second electrode of the ninth sub-transistor T161 may be connected to a first electrode of the tenth sub-transistor T162. A gate electrode of the tenth sub-transistor T162 may be connected to the scan control line GCL, the first electrode of the tenth sub-transistor T162 may be connected to the second electrode of the ninth sub-transistor T161, and a second electrode of the tenth sub-transistor T162 may be connected to the initialization voltage line VIL.

The seventeenth thin film transistor T17 may be turned on by the first emission control signal (e.g., a PAM emission control signal) of the first emission control line PAEL, to electrically connect the second electrode of the fifteenth thin film transistor T15 to the first electrode of the light emitting element ED. A gate electrode of the seventeenth thin film transistor T17 may be connected to the first emission control line PAEL, a first electrode of the seventeenth thin film transistor T17 may be connected to the second electrode of the fifteenth thin film transistor T15, and a second electrode of the seventeenth thin film transistor T17 may be connected to the first electrode of the light emitting element ED.

The eighteenth thin film transistor T18 may be turned on by the scan control signal of the scan control line GCL, to electrically connect the initialization voltage line VIL to the first electrode of the light emitting element ED. Accordingly, while the eighteenth thin film transistor T18 is turned on, the first electrode of the light emitting element ED may be discharged with the initialization voltage of the initialization voltage line VIL. A gate electrode of the eighteenth thin film transistor T18 may be connected to the scan control line GCL, a first electrode of the eighteenth thin film transistor T18 may be connected to the first electrode of the light emitting element ED, and a second electrode of the eighteenth thin film transistor T18 may be connected to the initialization voltage line VIL.

The nineteenth thin film transistor T19 may be turned on by a test signal of a test signal line TSTL, to electrically connect the first electrode of the light emitting element ED to the second power source line VSL. A gate electrode of the nineteenth thin film transistor T19 may be connected to the test signal line TSTL, a first electrode of the nineteenth thin film transistor T19 may be connected to the first electrode of the light emitting element ED, and a second electrode of the nineteenth thin film transistor T19 may be connected to the second power source line VSL.

The third capacitor C3 may be disposed between the third node N3 and the initialization voltage line VIL. One electrode of the third capacitor C3 may be connected to the third node N3 and the other electrode of the third capacitor C3 may be connected to the initialization voltage line VIL.

One of the first electrode and the second electrode of each of the thin film transistors T1 to T19 may be a source electrode and the other may be a drain electrode. The thin film transistors T1 to T19 may include a silicon semiconductor or an oxide semiconductor. Each of the thin film transistors T1 to T19 may be a P-type transistor, but the present disclosure is not limited thereto. For example, at least one of the thin film transistors T1 to T19 may be an N-type transistor.

Referring to FIGS. 10, 15, and 16, the fifth period P5, the sixth period P6, a seventh period P7, and an eighth period P8 may be included in one frame period (e.g., the frame period FRAME of FIG. 14). The operation of the pixel PX_1 in the fifth period P5 and the sixth period P6 of FIG. 16 may be the same or substantially the same as (or similar to) the operation of the pixel PX (e.g., refer to FIG. 9) in the fifth period P5 and the sixth period P6 of FIG. 10. Therefore, redundant description thereof may not be repeated.

In the seventh period P7, the scan initialization signal of a turn-on level may be applied to the scan initialization line GIL. Based on a P-type transistor, the turn-on level may be a low level and a turn-off level may be a high level. In this case, the third thin film transistor T3 may be turned on, and the gate electrode of the first thin film transistor T1 may be discharged or initialized with the initialization voltage of the initialization voltage line VIL. Also, the tenth thin film transistor T10 may be turned on, and the gate electrode of the eighth thin film transistor T8 may be discharged or initialized with the initialization voltage of the initialization voltage line VIL. In other words, in the seventh period P7, the pixel PX_1 (e.g., the driving transistors) may be initialized.

In the eighth period P8, the scan write signal of a turn-on level may be applied to the scan write line GWL. In this case, the second thin film transistor T2 and the fourth thin film transistor T4 may be turned on, and the data voltage of the data line DL may be applied to the gate electrode of the first thin film transistor T1. Also, the ninth thin film transistor T9 and the eleventh thin film transistor T11 may be turned on, and the PAM data voltage of the PAM data line RDL may be applied to the gate electrode of the eighth thin film transistor T8. In other words, in the eighth period P8, the data voltage and the PAM data voltage may be written to the pixel PX_1.

In the display device according to the embodiments of the present disclosure, because a sweep circuit for generating a sweep signal may be embedded in each pixel, PWM driving may be possible.

In addition, the sweep circuit may charge a capacitor with a data signal, and may discharge the capacitor at a constant or substantially constant rate using a transistor. Therefore, the sweep signal corresponding to the data signal may be generated directly. Accordingly, a circuit structure of a pixel may be simplified.

Furthermore, the sweep circuit may control a slope of the sweep signal by adjusting a gate-source voltage of the transistor, and a cycle of the sweep signal may be easily adjusted by controlling the slope of the sweep signal.

The aspects and features according to the embodiments of the present disclosure are not limited by those described above, and various other aspects and features may be included in the present disclosure as would be apparent to those having ordinary skill in the art from the above description with reference to the figures, or learned by practicing one or more of the presented embodiments of the present disclosure.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising a pixel, the pixel comprising:

a light emitting element;

a first pixel circuit comprising at least one capacitor and at least one transistor, and configured to generate a sweep signal that changes linearly over time from a voltage level of a data signal received through a data line; and a second pixel circuit comprising at least one transistor, and configured to adjust a duty cycle of a current flowing through the light emitting element based on the sweep signal.

2. The display device of claim 1, wherein the pixel comprises a plurality of pixels, and each of the plurality of pixels comprises a corresponding first pixel circuit of the first pixel circuit.

3. The display device of claim 1, wherein the first pixel circuit is configured to linearly decrease a voltage level of the sweep signal while the light emitting element emits light.

4. The display device of claim 1, wherein the first pixel circuit is configured to:

charge a capacitor of the at least one capacitor using the data signal;

discharge the capacitor at a constant rate using the at least one transistor of the first pixel circuit; and output a voltage of one electrode of the capacitor as the sweep signal.

5. The display device of claim 1, wherein the first pixel circuit comprises:

a first transistor;

a first capacitor between a first power source line and a first terminal of the first transistor;

a second capacitor between a gate electrode of the first transistor and a second terminal of the first transistor;

a second transistor including a first terminal connected to the first power source line, a second terminal connected to the gate electrode of the first transistor, and a gate electrode connected to a second control line;

a third transistor including a first terminal connected to the second terminal of the first transistor, a second terminal connected to a second power source line, and a gate electrode connected to a first control line;

a fourth transistor including a first terminal connected to a third power source line, a second terminal connected to the first terminal of the first transistor, and a gate electrode connected to a third control line; and a fifth transistor including a first terminal connected to the first terminal of the first transistor, a second terminal connected to the data line, and a gate electrode connected to a fourth control line.

6. The display device of claim 5, wherein each of the first, second, third, fourth, and fifth transistors is an N-type transistor.

7. The display device of claim 5, further comprising a gate driver connected to the first control line, the second control line, the third control line, and the fourth control line, wherein in a first period, the gate driver is configured to apply a first control signal of a turn-on level to the first control line, and apply a second control signal of the turn-on level to the second control line.

8. The display device of claim 7, wherein in a second period, the gate driver is configured to apply a first control signal of a turn-off level to the first control line, and apply a third control signal of the turn-on level to the third control line.

9. The display device of claim 8, wherein the first pixel circuit is configured to change a voltage of the second terminal of the first transistor according to a width of the second period, and change a slope of the sweep signal according to the voltage of the second terminal of the first transistor.

10. The display device of claim 9, wherein the first pixel circuit is configured to decrease the slope of the sweep signal as the width of the second period increases.

11. The display device of claim 8, wherein in a third period, the gate driver is configured to apply a control signal of the turn-off level to the second control line and the third control line, and apply a fourth control signal of the turn-on level to the fourth control line.

12. The display device of claim 11, wherein in a fourth period, the gate driver is configured to apply the first control signal of the turn-on level to the first control line, and a voltage level of the sweep signal decreases over time.

13. The display device of claim 1, wherein the second pixel circuit comprises:

a sixth transistor connected between a first high power source line and a control node, and configured to operate in response to the sweep signal;

a seventh transistor connected between a second high power source line and the light emitting element, and configured to operate in response to a voltage of the control node;

an eighth transistor connected between the control node and an initialization power source line; and a third capacitor connected between the control node and the initialization power source line.

14. A display device comprising a pixel, the pixel comprising:

a light emitting element;

a first pixel circuit comprising at least one capacitor and at least one transistor, and configured to generate a sweep signal that changes linearly over time from a first voltage level; and a second pixel circuit comprising at least one transistor, and configured to adjust a duty cycle of a current flowing through the light emitting element based on a data signal received through a data line and the sweep signal.

15. The display device of claim 14, wherein the first pixel circuit is configured to discharge the at least one capacitor at a constant rate using the at least one transistor of the first pixel circuit, and output a voltage of one electrode of the at least one capacitor as the sweep signal.

16. The display device of claim 14, wherein the first pixel circuit comprises:

a first transistor;

a first capacitor between a first power source line and a first terminal of the first transistor;

a second capacitor between a gate electrode of the first transistor and a second terminal of the first transistor;

a second transistor including a first terminal connected to the first power source line, a second terminal connected to the gate electrode of the first transistor, and a gate electrode connected to a second control line;

a third transistor including a first terminal connected to the second terminal of the first transistor, a second terminal connected to a second power source line, and a gate electrode connected to a first control line; and a fourth transistor including a first terminal connected to a third power source line, a second terminal connected to the first terminal of the first transistor, and a gate electrode connected to a third control line.

17. The display device of claim 16, further comprising a gate driver connected to the first control line, the second control line, and the third control line, wherein in a first period, the gate driver is configured to apply a first control signal of a turn-on level to the first control line, and apply a second control signal of the turn-on level to the second control line.

18. The display device of claim 17, wherein in a second period, the gate driver is configured to apply a first control signal of a turn-off level to the first control line, and apply a third control signal of the turn-on level to the third control line.

19. The display device of claim 18, wherein the first pixel circuit is configured to change a voltage of the second terminal of the first transistor according to a width of the second period, and change a slope of the sweep signal according to the voltage.

20. The display device of claim 19, wherein in a third period, the gate driver is configured to apply the first control signal of the turn-on level to the first control line, and a voltage level of the sweep signal decreases over time.

* * * * *